US012774913B2

(12) United States Patent
Otsu et al.

(10) Patent No.: US 12,774,913 B2
(45) Date of Patent: Oct. 27, 2026

(54) LEVEL METER

(71) Applicant: Keyence Corporation, Osaka (JP)

(72) Inventors: Shinichiro Otsu, Osaka (JP); Yusuke Sugiura, Osaka (JP)

(73) Assignee: KEYENCE CORPORATION, Osaka (JP)

(*) Notice: Subject to any disclaimer, the term of this patent is extended or adjusted under 35 U.S.C. 154(b) by 196 days.

(21) Appl. No.: 18/785,095

(22) Filed: Jul. 26, 2024

(65) Prior Publication Data

US 2025/0102343 A1 Mar. 27, 2025

(30) Foreign Application Priority Data

Sep. 25, 2023 (JP) ................................ 2023-159391

(51) Int. Cl.
*G01F 23/284* (2006.01)

(52) U.S. Cl.
CPC ................................ *G01F 23/284* (2013.01)

(58) Field of Classification Search
CPC ........................... G01F 23/284; G01B 11/026
USPC ........................................................ 342/124
See application file for complete search history.

(56) References Cited

U.S. PATENT DOCUMENTS 4,580,441 A * 4/1986 Sakurai ................. G01N 22/00
250/250
8,085,187 B2 * 12/2011 Gard ..................... G01F 23/284
361/755
9,557,205 B2 * 1/2017 Sanders .................. G01F 23/02
10,074,907 B2 * 9/2018 Ding ......................... G01S 7/03
11,555,732 B2 * 1/2023 McCormick ............ G01S 13/88
2003/0168674 A1 * 9/2003 Muller .................. G01F 23/284
257/200

(Continued)

FOREIGN PATENT DOCUMENTS

CN 110637393 A * 12/2019 ............... G01S 7/03
DE 102015113955 A1 3/2017

(Continued)

OTHER PUBLICATIONS

U.S. Appl. No. 18/605,908, filed Mar. 15, 2024 (54 pages).

(Continued)

*Primary Examiner* — Nuzhat Pervin
(74) *Attorney, Agent, or Firm* — Kilyk & Bowersox, P.L.L.C.

(57) ABSTRACT

To reduce a reflection wave that causes a stray signal wave in a level meter. The level meter includes a sensor substrate, a radio wave shaping member, a dielectric lens, and a radio wave absorbing member. The radio wave shaping member includes an element case covering an internal space including a transmitting unit and a receiving unit mounted on a sensor substrate, a waveguide having one end in electromagnetic communication with the element case, and a horn having a radio wave path gradually expanding from the other end of the waveguide toward a traveling direction of a transmitted radio wave. The dielectric lens is provided at the leading end of the horn, and deflects the radio wave from the transmitter through the radio wave shaping member to the object. The radio wave absorbing member is provided along the inner wall of the element case and absorbs radio waves.

8 Claims, 16 Drawing Sheets

(56) References Cited

U.S. PATENT DOCUMENTS

| | | | | |
|---|---|---|---|---|
| 2006/0033506 | A1* | 2/2006 | Fehrenbach | H01Q 1/225 342/124 |
| 2013/0328696 | A1* | 12/2013 | Drachmann | H01Q 1/04 340/870.02 |
| 2018/0301819 | A1* | 10/2018 | Kirino | G01S 1/00 |
| 2018/0375218 | A1* | 12/2018 | Kamo | H01Q 13/0283 |
| 2019/0310345 | A1* | 10/2019 | Nagaishi | H01Q 21/06 |
| 2020/0176886 | A1* | 6/2020 | Kirino | G01S 7/03 |
| 2021/0143533 | A1* | 5/2021 | Nagaishi | H01Q 1/422 |
| 2024/0035873 | A1* | 2/2024 | Bergmann | G01F 23/284 |
| 2025/0266620 | A1* | 8/2025 | Dou | H01Q 15/02 |
| 2026/0063754 | A1* | 3/2026 | Katsuta | G01S 7/032 |

FOREIGN PATENT DOCUMENTS

| | | | | |
|---|---|---|---|---|
| EP | 2980539 | A1 * | 2/2016 | H01Q 1/225 |
| EP | 2861944 | B1 * | 1/2021 | G01F 23/804 |
| JP | 2014002091 | A | 1/2014 | |
| RU | 2656027 | C2 * | 5/2018 | G01F 23/284 |

OTHER PUBLICATIONS

U.S. Appl. No. 18/605,909, filed Mar. 15, 2024 (60 pages).
U.S. Appl. No. 18/605,916, filed Mar. 15, 2024 (61 pages).
U.S. Appl. No. 18/785,058, filed Jul. 26, 2024 (104 pages).
U.S. Appl. No. 18/785,075, filed Jul. 26, 2024 (80 pages).
U.S. Appl. No. 18/785,131, filed Jul. 26, 2024 (34 pages).

* cited by examiner

LEVEL METER

CROSS-REFERENCE TO RELATED APPLICATIONS

The present application claims foreign priority based on Japanese Patent Application No. 2023-159391, filed Sep. 25, 2023, the contents of which are incorporated herein by reference.

BACKGROUND OF THE INVENTION

1. Technical Field

The present invention relates to a level meter that measures a level of an object.

2. Description of the Related Art

In a container that stores a flowable substance such as a liquid, a powder, or a granular material, a level meter that measures a height of an interface of the substance, that is, a level (liquid level, powder upper surface level, etc.) may be used (JP 2014-002091 A). As such a level meter, DE 102015113955 A1 describes that a radio wave transmission signal is transmitted into a container during a measuring operation, and an echo signal reflected on the surface of a flowable substance is received after a level-dependent transit time. A millimeter wave is generally used as the radio wave transmission signal.

A level meter using an electromagnetic transmission signal typically includes a millimeter wave radar. In the millimeter wave radar, a configuration for transmitting and receiving radio waves using a patch antenna configured by a pattern formed on a circuit board is mainly used. Then, in order to improve directivity as a radar, it is common to emit a radio wave signal emitted from a patch antenna after narrowing the spread of the radio wave by passing through a horn antenna and a lens antenna.

Instead of the patch antenna, it is also possible to use a radar IC having an antenna-on-package structure that is more versatile and less expensive than the patch antenna. In a radar IC, a transmission wave and a reception wave are often separated, but in order to constitute a level meter, it is necessary to equalize transmission and reception paths as a radar.

By including the element case, the waveguide, the horn, and the lens as elements for this purpose, transmission and reception paths are aligned, and directivity is enhanced.

However, in a known level meter using a radar IC, reflection of a signal wave occurs not a little in an element case, a lens, or the like. For this reason, in a case where the surface of the substance having fluidity exists at a position close to the level meter, there is a problem that the reflection wave that has become the stray signal wave is received, and the stray signal generated thereby is superimposed on the detection signal as noise. For this reason, there is a problem that the margin to the detection limit decreases in a case where the level detection is performed at a near distance.

Furthermore, for example, in a case where a substance having fluidity, which is a detection target of a level, has a relative dielectric constant lower than that of water, the level of the reflection wave is lower than that in a case of water according to the relative dielectric constant. Therefore, in a case where a level of a substance having a low relative dielectric constant other than water is detected at a near distance, the detection stability is lowered.

SUMMARY OF THE INVENTION

Therefore, an object of the present invention is to reduce a reflection wave that causes a stray signal wave in a level meter.

In order to solve the above problems, a level meter as an example of an embodiment of the present invention includes:

- a substrate on which a transmitter and a receiver are mounted.

The level meter includes:

- a radio wave shaping member including an element case that covers a space including the transmitter and the receiver mounted on the substrate, a waveguide having one end that electromagnetically communicates with the element case, and a horn having a radio wave path gradually expanding from an other end of the waveguide toward a traveling direction of a transmission radio wave;
- a dielectric lens that is provided at a leading end of the horn and deflects a radio wave from the transmitter via the radio wave shaping member to an object; and
- a radio wave absorbing member that is provided along an inner wall of the element case and absorbs radio waves.

In the level meter as another example of the embodiment of the present invention, the radio wave absorbing member is provided along an inner wall of the horn.

The level meter as still another example of the embodiment of the present invention includes:

- a metal casing that accommodates a substrate, a radio wave shaping member, and a dielectric lens; and
- an attachment member formed of a dielectric for attaching the dielectric lens to the metal casing in contact with the dielectric lens.

In the level meter as still another example of the embodiment of the present invention, the dielectric lens is formed of a lens material including a low dielectric constant material having a relative dielectric constant of 2 to 3 and a high dielectric loss tangent material having a dielectric loss tangent higher than that of the low dielectric constant material.

In the level meter as still another example of the embodiment of the present invention, the high dielectric loss tangent material is a polychlorotrifluoroethylene resin.

In the level meter as still another example of an embodiment of the present invention, the waveguide includes a waveguide tube, and coaxially couples a transmission wave from the transmitter and a reception wave to the receiver.

In the level meter as still another example of an embodiment of the present invention, the dielectric lens has a protruding cross-sectional shape protruding towards the waveguide.

The level meter as still another example of the embodiment of the present invention includes:

- a casing that accommodates a substrate, a radio wave shaping member, and a dielectric lens, the casing being capable of being attached to a container that stores a substance having fluidity; and
- an adapter attached to the container and capable of attaching the casing,
- in which when the casing is attached to the adapter, a first distance from a surface of the flowable substance to the substrate is longer than a second distance from a surface of the flowable substance to the substrate when the casing is attached to the container.

According to the level meter of the present invention, since the radio wave absorbing member that is provided along the inner wall of the element case covering the space including the transmitter and the receiver mounted on the substrate and absorbs radio waves is provided, unnecessary reflection waves other than reflection waves from the object can be absorbed. Therefore, it is possible to reduce the reflection wave that causes the stray signal in the level meter. As a result, the detection performance of the level of the object surface, in particular at a distance close to the level meter, is improved.

DETAILED DESCRIPTION

Hereinafter, a level meter 10 as an example of an embodiment according to the present invention will be described with reference to the drawings. In the stereoscopic view of FIG. 1, the level meter 10 of the present embodiment is illustrated. The level meter 10 is a device that measures the level of an object to be measured (for example, liquid, powder, granular material, and the like). The measured level is the height of the interface of the object. Specific examples of the level include the height of the liquid level of the liquid contained in a container.

Figure 1:
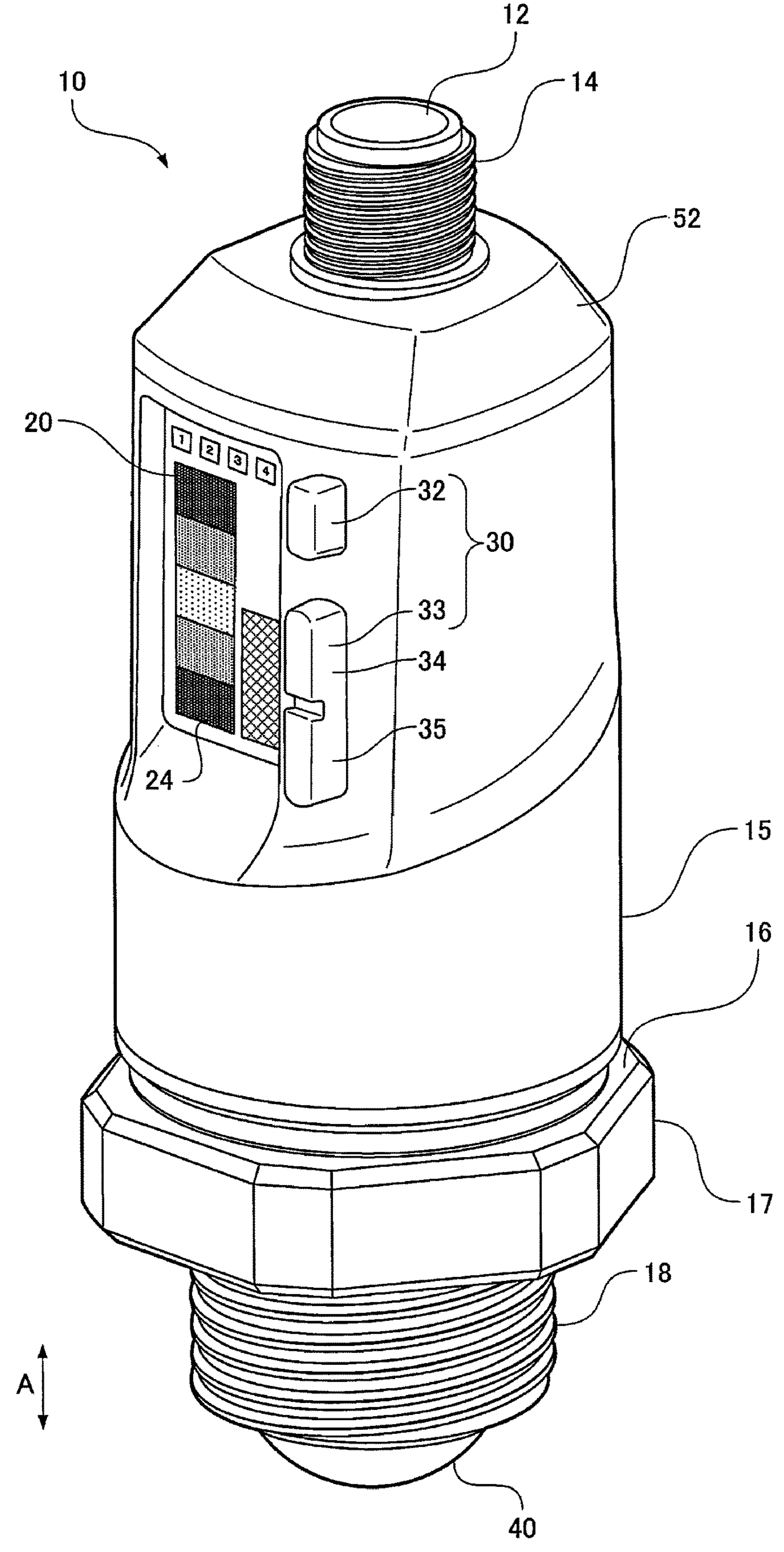
FIG. 1 is a stereoscopic view of a level meter.

The level meter 10 has a longitudinal direction A. In FIG. 1, the level meter 10 has a generally cylindrical shape extending in the longitudinal direction A. The level meter 10 includes a casing 15 and a sensor unit 16. The casing 15 and the sensor unit 16 are arranged along the longitudinal direction A. The sensor unit 16 is disposed on one end side (lower side in FIG. 1) of the level meter 10 in the longitudinal direction A, and the casing 15 is disposed on the other end side (upper side in FIG. 1) in the longitudinal direction A. One end of the sensor unit 16 in the longitudinal direction A is a measurement end 40. In FIG. 1, the casing 15 and the sensor unit 16 each include a portion having a cylindrical shape extending in the longitudinal direction A.

Hereinafter, one end side of the level meter 10 in the longitudinal direction A may be referred to as a lower side, and the other end side in the longitudinal direction A may be referred to as an upper side. The sensor unit 16 measures the level of the object with the lower side in the longitudinal direction A facing the object. A measurement axis is set in the sensor unit 16 of FIG. 1. The sensor unit 16 measures the level along the measurement axis. The sensor unit 16 of FIG. 1 measures the level of the object in a state where the measurement end 40 faces the object. When the level meter 10 measures the level of the object, it is preferable that a change direction of the level of the object to be measured (for example, liquid such as water) and the longitudinal direction A are the same direction. That is, the direction of the measurement axis of the sensor unit 16 and the longitudinal direction A are preferably the same direction. For example, when the level meter 10 measures the height (level) of the liquid level of the liquid, the longitudinal direction A is preferably the same direction as the change direction of the height of the liquid level of the liquid, that is, the vertical direction (height direction, gravitation direction).

In the level meter 10 of FIG. 1, a radio wave serving as a transmission wave is transmitted from the measurement end 40 toward the object, and a reflection wave reflected by the object is received by the measurement end 40. The level meter 10 calculates the level of the object based on the transmission wave and the reflection wave.

An attachment screw 18 in which a thread is engraved on the surface of the cylinder is provided above the measurement end 40 in the sensor unit 16. An attachment portion 17 having a diameter larger than that of the attachment screw 18 is provided above the attachment screw 18. The attachment portion 17 in FIG. 1 has a nut shape. Note that the attachment portion 17 is not limited to a nut shape as long as it has a structure capable of attaching the level meter 10 to an attachment target (such as a tank that stores liquid). For example, the attachment portion 17 may have a cylindrical shape in which an anti-slip projection is formed. The anti-slip projection of the attachment portion 17 serves as an anti-slip portion when the level meter 10 is attached or detached (rotationally attached or detached) while rotating around the longitudinal direction A with respect to the attachment target. An attachment flange for attaching the level meter 10 to an attachment target may be formed instead of the attachment portion 17 and the attachment screw 18. Even in a case where the attachment flange is formed, the attachment portion 17 and the attachment screw 18 may be provided in addition to the attachment flange.

The casing 15 disposed above the sensor unit 16 is provided with a display portion 20. The display portion 20 is disposed on an outer peripheral surface of the casing 15 extending along the longitudinal direction A. In FIG. 1, a flat portion along the longitudinal direction A is provided in a part of the outer peripheral surface of the casing 15, and the display portion 20 is disposed in the flat portion.

An operation switch 30 is also disposed in a portion of the outer surface of the casing 15 where the display portion 20 is disposed. The operation switch 30 of FIG. 1 is disposed adjacent to the rectangular active matrix display elongated along the longitudinal direction A, and includes a setting key 32 and a direction key 33 arranged along the longitudinal direction A. The direction key 33 includes an up key 34 and a down key 35 arranged along the longitudinal direction A. The user of the level meter 10 can change the operation parameter of the level meter 10 by operating the operation switch 30. In particular, the user can change the setting of the display content and the level range in the display portion 20 by operating the operation switch 30.

A connection portion 12 is provided on the upper side of the casing 15. The connection portion 12 in FIG. 1 has a cylindrical shape extending along an axis parallel to the longitudinal direction A. An outer peripheral surface of the cylindrical connection portion 12 is a connection screw portion 14 in which a thread is cut.

A status lamp 52 is provided between the connection portion 12 and the display portion 20 so as to surround the lower side (root) of the connection portion 12. In FIG. 1, since the connection portion 12 has a cylindrical shape extending along the axis parallel to the longitudinal direction A, the status lamp 52 is disposed so as to surround the axis parallel to the longitudinal direction A. The lighting state of the status lamp 52 changes according to the measured level of the object. The user can roughly know the state of the object by visually observing the lighting state of the status lamp 52.

Figure 2:
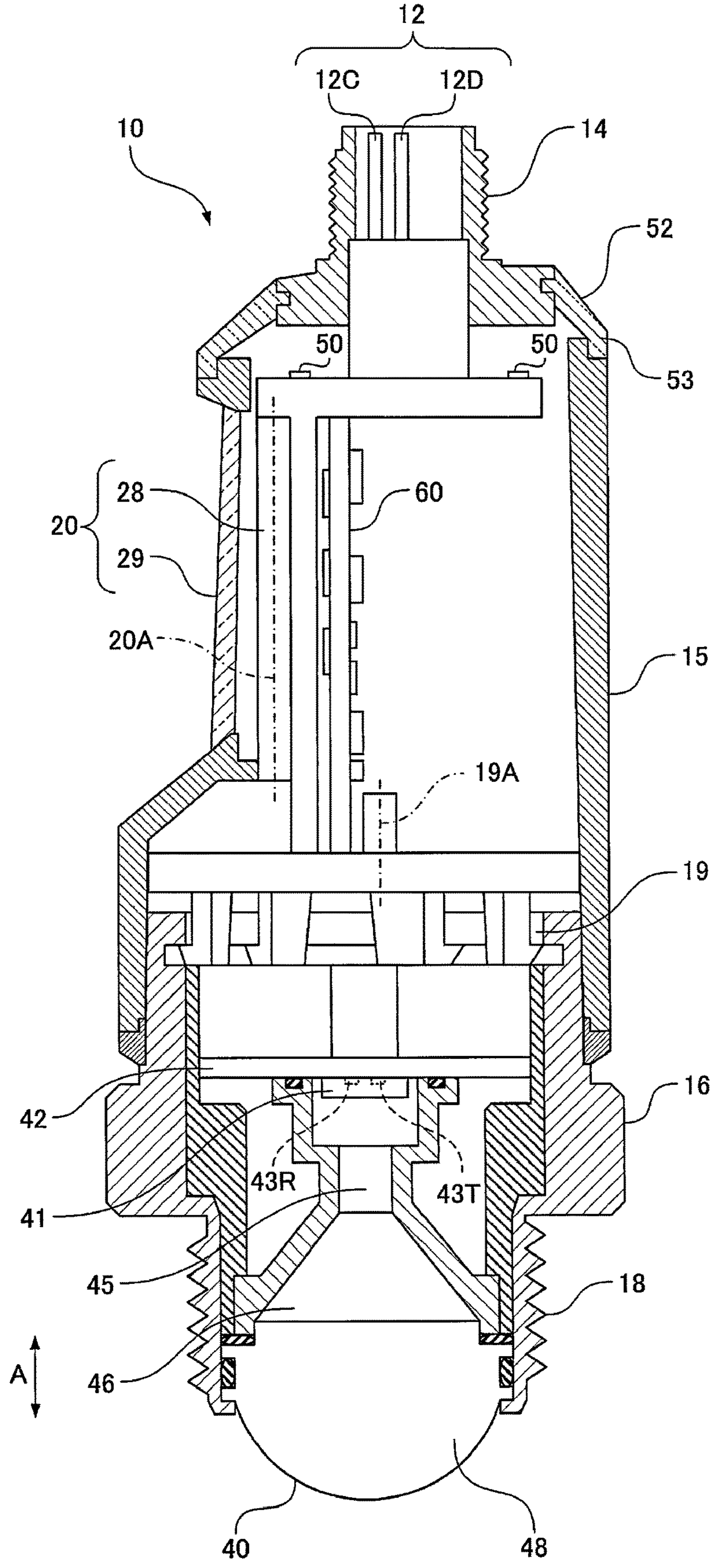
FIG. 2 is a longitudinal cross-sectional view of the level meter.

With reference to FIG. 2, an internal structure of the level meter 10 will be described. FIG. 2 is a cross-sectional view illustrating a cross section of the level meter 10 in FIG. 1 taken along a plane (and a plane parallel to the longitudinal direction A) intersecting the display portion 20.

Inside the sensor unit 16, a sensor IC 41 and a sensor board 42 that supports the sensor IC 41 are arranged. The sensor IC 41 performs transmission and reception of radio waves and signal processing for measuring the level of the object. The signal processed by the sensor IC 41 is transmitted to a display board 60 inside the casing 15.

As the sensor IC 41, for example, an MMIC (Monolithic Microwave Integrated Circuit) is used. The MMIC is an IC in which a plurality of semiconductor components that perform transmission of radio waves, reception of radio waves, signal processing based on transmitted and received radio waves, and the like are integrated into a single semiconductor device (one chip). In the sensor IC 41 of FIG. 2, an antenna is integrated with the MMIC by using an antenna in package (AiP) technology or an antenna on package (AoP) technology. That is, in FIG. 2, the sensor IC 41 is an antenna-integrated package (antenna on package) in which a transmission unit that transmits a radio wave and a reception unit that receives a radio wave are integrated in a single semiconductor device. Since the antenna-integrated MMIC is used as the sensor IC 41, the volume occupied by the configuration for transmitting and receiving radio waves is reduced, and the entire dimension of the level meter 10 becomes compact. The sensor IC 41 is not limited to the antenna-integrated MMIC alone, and may include a plurality of ICs. The sensor IC 41 may include, for example, an antenna-integrated MMIC and a microcomputer. Then, the antenna-integrated MMIC may include a radio wave transmission antenna, a radio wave reception antenna, and a circuit that executes radio wave transmission/reception control, and the microcomputer may include a circuit that executes signal processing or arithmetic processing based on a reception signal received from the antenna-integrated MMIC.

The sensor IC 41 is mounted on the lower surface of the sensor board 42. The sensor board 42 is an electronic circuit board in which various electronic circuit elements are arranged on a plate made of an insulator such as glass or resin. In FIG. 2, the sensor board 42 is disposed in a direction orthogonal to the longitudinal direction A (horizontal direction in FIG. 2). In a case where the sensor IC 41 is an antenna-integrated MMIC, the sensor IC 41 includes a transmission unit 43T that transmits a radio wave and a reception unit 43R that receives a radio wave. Since the sensor IC 41 includes the transmission unit 43T and the reception unit 43R, the sensor unit 16 includes the transmission unit 43T and the reception unit 43R. By mounting the sensor IC 41 on the lower surface of the sensor board 42, the transmission unit 43T and the reception unit 43R are arranged on the lower surface (one end side in the longitudinal direction A) of the sensor board 42.

The measurement end 40 is located below the sensor board 42. The measurement end 40 of FIG. 2 includes a waveguide 45 as a waveguide, a horn 46, and a dielectric lens 48 as internal structures. In a case where the sensor IC 41 is an antenna-integrated MMIC, a radio wave serving as a transmission wave is transmitted from the sensor IC 41. The transmission wave transmitted from the sensor IC 41 is guided toward the object through the waveguide 45, the horn 46, and the dielectric lens 48 in this order. The reflection wave reflected by the object and incident on the measurement end 40 is guided toward the sensor IC 41 through the dielectric lens 48, the horn 46, and the waveguide 45 in this order. The waveguide 45 makes the transmission wave from the transmission unit 43T and the reflection wave to the reception unit 43R, that is, the reception wave coaxial. In a case where the portion where the attachment screw 18 is provided on the lower side of the sensor unit 16 is cylindrical, the cross section thereof is circular. In this case, the circular dielectric lens 48 can be disposed on the lower side (one end side in the longitudinal direction A) of the cylindrical portion. That is, when the sensor unit 16 has a cylindrical portion on the lower side, the cylindrical portion can serve as both a portion to be attached to an installation target (such as a tank) of the level meter 10 and an arrangement place of the dielectric lens 48, and thus the entire dimension of the level meter 10 becomes compact.

On the other hand, a rotation mechanism 19 is provided inside the casing 15 disposed above the sensor unit 16. The rotation mechanism 19 in FIG. 2 is disposed at a lower end (one end in the longitudinal direction A) of the casing 15, that is, between the casing 15 and the sensor unit 16. The rotation mechanism 19 can relatively rotate the casing 15 with respect to the sensor unit 16 about a rotation axis 19A. For example, the rotation mechanism 19 is a mechanism having a shaft extending along the rotation axis 19A between the casing 15 and the sensor board 42. The shaft is connected to the casing 15 via a bearing or the like arranged around the axis, and is configured such that the rotation of the casing 15 about the rotation axis 19A is not transmitted to the sensor unit 16. It is preferable that the rotation mechanism 19 can hold the casing 15 and the sensor board 42 in a state where a relative rotation angle between the housing and the sensor board becomes a desired angle. For example, the rotation mechanism 19 may include components such as a damper element serving as a rotational resistance and a rotation lock that prevents rotation so as to be held at a specific rotation angle. In addition to the above configuration, the rotation mechanism 19 may include an engagement protrusion formed on the sensor unit 16 and a plurality of hooks provided on the casing 15. The engagement protrusion is disposed on the outer periphery of the cylindrical portion in the upper part of the sensor unit 16, and is formed long along the circumferential direction. The engagement protrusion of the sensor unit 16 may have a continuous shape so as to make one round in the circumferential direction. The plurality of hooks of the casing 15 are arranged at intervals in an annular shape corresponding to the engagement protrusion of the sensor unit 16. Each hook engages a lower surface of the engagement protrusion. Each hook rotates while sliding in the circumferential direction when receiving an external force. In a case where the rotation mechanism 19 includes the engagement protrusion and the hook, the casing 15 may be provided with an elastic body that generates a pressing force that pushes and spreads between the sensor unit 16 and the casing 15. Since the elastic body is provided, sliding resistance between the engagement protrusion and each hook is adjusted. The rotation mechanism 19 of FIG. 2 is disposed such that the rotation axis 19A is oriented in a direction parallel to the longitudinal direction A (vertical direction in FIG. 2). The display portion 20 is arranged on a flat surface formed at a position offset toward the rotation axis 19A in the casing 15. That is, the flat surface of the casing 15 is located away from the plane including the rotation axis 19A. Since the rotation mechanism 19 is provided, the user can turn the display portion 20 in a direction in which it is easy to view by rotating the casing 15. In particular, when the level meter 10 is attached to a container (such as a tank) including a measurement target by the attachment screw 18, the user can direct the display portion 20 in a direction in which the user can easily see the display portion 20 without moving the entire level meter 10.

In the casing 15, the display board 60 is disposed above the rotation mechanism 19. The display board 60 is an electronic circuit board in which various electronic circuit elements are arranged on a plate made of an insulator such as glass or resin. In FIG. 2, the display board 60 is disposed in a direction parallel to the longitudinal direction A (vertical direction in FIG. 2). A signal processing circuit for controlling the display portion 20 is mounted on the display board 60. The display board 60 receives a signal from the sensor IC 41, and converts the level of the object measured by the sensor unit 16 into a signal for displaying the level in the display portion 20. The display board 60 of FIG. 2 is disposed on the back side of the display portion 20 (inside the casing 15 in FIG. 2).

The display portion 20 in FIG. 2 includes a display device 28 and a transparent display window 29. The display device 28 is, for example, an LCD, particularly an LCD capable of color display. The display window 29 is, for example, a plate made of an optically transparent material such as glass, acrylic, polyarylate, or polycarbonate, and optically transmits the display content of the display device 28 to the outside of the casing 15. The display device 28 is directed in the direction of the display surface 20A along the longitudinal direction A. In addition, in FIG. 2, the display board 60 is directed along the display surface 20A.

Since the display device 28 and the display board 60 are directed in the direction along the longitudinal direction A, the components for operating the display device 28 of the display portion 20 are arranged along the longitudinal direction A (height direction) inside the level meter 10. Therefore, the area occupied by the components for operating the display portion 20 over the direction (radial direction) perpendicular to the longitudinal direction A is reduced, and the entire dimension of the level meter 10 is made compact. In FIGS. 1 and 2, the diameter dimension of the cylindrical casing 15 is smaller than the diameter dimension of the sensor unit 16. Note that the diameter dimension of the casing 15 is not necessarily smaller than the diameter dimension of the sensor unit 16, and the diameter dimension of the casing 15 and the sensor unit 16 may be the same, or the diameter dimension of the sensor unit 16 may be smaller.

The status lamp 52 provided between the display portion 20 and the connection portion 12 above the display portion 20 (on the other end side in the longitudinal direction A) includes a plurality of state LEDs 50 serving as light sources and a transmission window 53 that diffuses light emitted from the state LEDs 50 in a direction intersecting the longitudinal direction A. A pillar for supporting a connection portion 12 may be provided between the state LED 50 and the transmission window 53. The plurality of state LEDs 50 are disposed above the display board 60 and the display portion 20. The lighting state of the state LED 50 changes according to the level of the object measured by the sensor unit 16. A transmission window 53 including a member (such as a light diffusion film) that diffuses light is disposed above the state LED 50. The light emitted from the state LED 50 is diffused in a direction intersecting the longitudinal direction A through the transmission window 53 and guided to the outside of the casing 15. Therefore, as the lighting state of the state LED 50 changes according to the level of the object, the lighting state of the status lamp 52 changes. Since the transmission window 53 includes a member that diffuses light, and the status lamp 52 (in particular, transmission window 53) is disposed so as to surround the axis parallel to the longitudinal direction A, the light emitted from the state LED 50 is uniformly diffused in all directions around the connection portion 12. Each of the state LEDs 50 may emit light in a single color (for example, red, yellow, green, and the like) or may emit light by switching a plurality of colors (for example, red, yellow, green, and the like). When the state LED 50 emits light by switching a plurality of colors, a plurality of light emitting elements that emit light in different colors may be included in one LED, or a combination of a plurality of LEDs that emit light in different colors may be arranged as the state LED 50. The state LED 50 may emit light by mixing a plurality of colors. When the state LED 50 emits light by switching a plurality of colors, the state LED 50 may emit light in a color corresponding to the color of the section of the gauge 24 (FIG. 1) corresponding to the level range to which the measured level belongs. Each of the state LEDs 50 is preferably capable of switching among a non-light emitting state (light-off state), a light emitting state, and a blinking state. The light source of the status lamp 52 only needs to be able to control the lighting state, and may be, for example, a light emitting element using an organic EL.

The connection portion 12 is disposed on the other end side (upper side) of the display portion 20 in the longitudinal direction A and on the extension of the rotation axis 19A. In FIG. 1, the connection portion 12 is provided at the upper end (the other end in the longitudinal direction A) of the casing 15. The connection portion 12 includes an external input terminal 12C and an external output terminal 12D serving as connection terminals with an external device. The external input terminal 12C is a terminal for inputting a signal or power, or both, from the outside to the level meter 10. The external output terminal 12D is a terminal for outputting a signal from the level meter 10 to the outside. The external output terminal 12D may include a plurality of signal lines or a plurality of output terminals. For example, signals may be output from different signal lines or different output terminals to the outside according to the level range to which the measured level belongs. Since the connection portion 12 is disposed on the extension of the rotation axis 19A, the position of the connection portion 12 does not change even when the casing 15 is rotated with respect to the sensor unit 16 by the rotation mechanism 19. Therefore, even if the casing 15 is rotated by the rotation mechanism 19, the connection with the outside by the connection portion 12 is not hindered. The position where the connection portion 12 is provided is not limited to the upper end of the casing 15. For example, the connection portion 12 may be disposed at a position on the surface of the casing 15 where the user can access (approach) the display portion 20 from the direction in which the user visually recognizes the display portion. In this case, it is expected that there is no obstacle in the direction in which the user visually recognizes the display portion 20 in order to make the display portion 20 visible to the user. Therefore, when the connection portion 12 is provided at a position where the user can access the display portion 20 from the direction in which the user visually recognizes the display portion 20, a space for routing the cable connected to the connection portion 12 is easily secured, and the level meter 10 is easily installed. The connection portion 12 may be disposed on the back surface with respect to the display portion 20. In this case, since the connection portion 12 can be provided in an unused dead space, the level meter 10 can be downsized. The external output terminal 12D may include a plurality of signal lines or a plurality of output terminals. For example, signals may be output from different signal lines or different output terminals to the outside according to the level range to which the measured level belongs.

Figure 3:
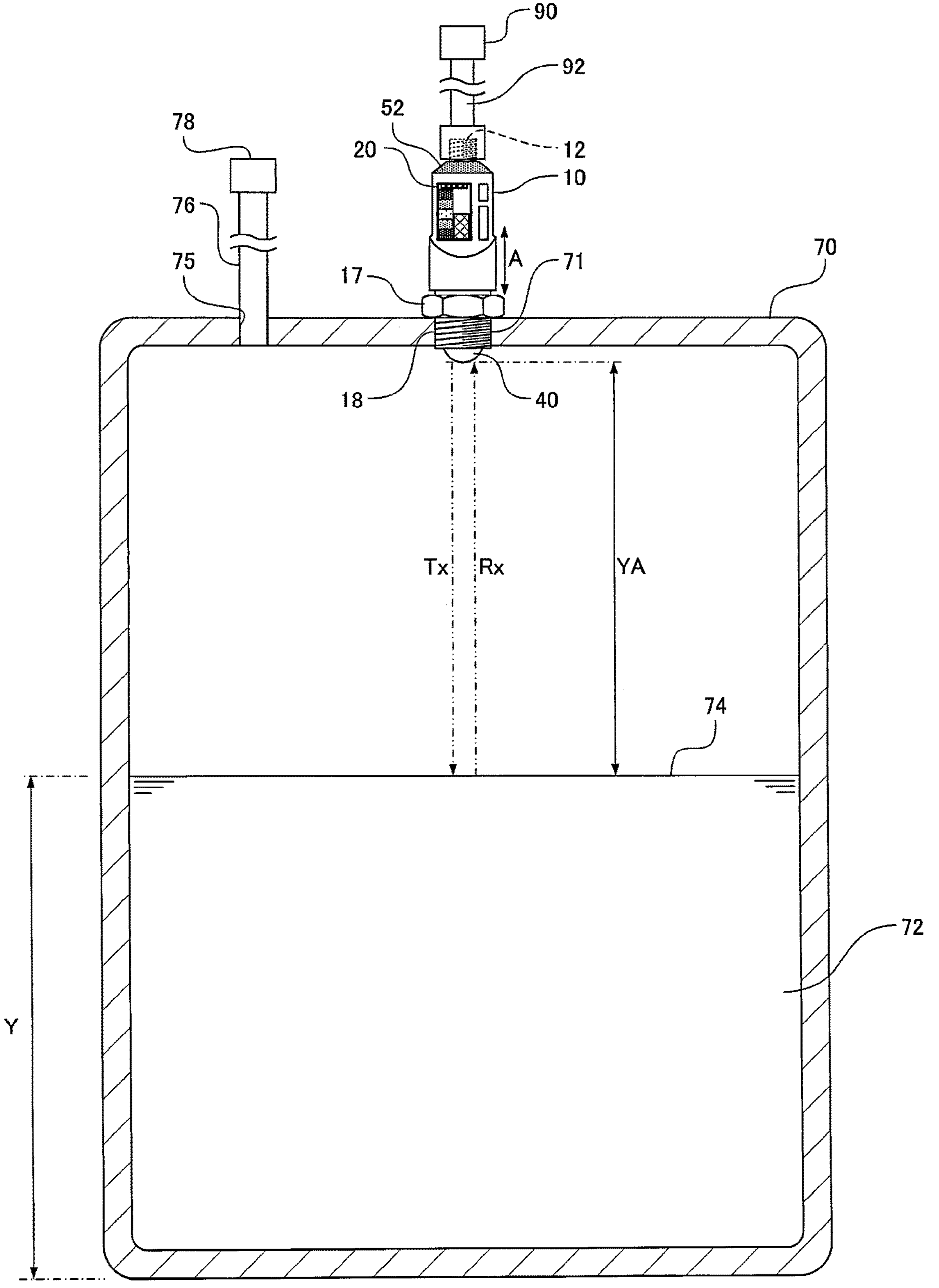
FIG. 3 is a view illustrating a state in which a level meter is attached to a tank that contains an object.

An example of a use state of the level meter 10 will be described with reference to FIG. 3. FIG. 3 is a view illustrating a state in which the level meter 10 is attached to a tank 70 that accommodates an object 72. The object 72 is, for example, a liquid such as water, and a level Y of the object 72 is a height from the bottom of the tank 70 to an interface 74 (liquid level) of the object 72.

The tank 70 contains water to be the object 72 in, for example, a water treatment facility. For example, when the object 72 in the tank 70 is supplied to a liquid treatment process or the like, the level Y of the object 72 in the tank 70 decreases. As the tank 70 is replenished with the object 72, the level Y of the object 72 in the tank 70 increases. For example, a water injection port 75 is provided in an outer wall (an upper wall in FIG. 3) of the tank 70. A water injection pipe 76 is fluidly connected to the tank 70 via the water injection port 75. Then, the water injection pipe 76 is connected to a water injection device 78 (device including, for example, a pump, a valve or the like) provided outside the tank 70. The water injection device 78 is a device that supplies (injects) the object 72 from the outside of the tank 70 into the tank 70. The water injection device 78 adjusts the amount of water injected into the tank 70 according to the level Y of the object 72 in the tank 70. The water injection device 78 stops the water pouring depending on the level Y of the object 72 in the tank 70. The water injection device 78 controls the replenishment of the object 72 to the tank 70 according to the level Y of the object 72 in the tank 70 such that the level Y of the object 72 in the tank 70, which decreases as the object 72 is consumed, for example, by the liquid treatment process, falls within a predetermined range.

The level meter 10 in FIG. 3 is attached to the upper side of the tank 70. An attachment hole 71 is provided above the tank 70. The attachment hole 71 is a screw hole, and the attachment screw 18 of the level meter 10 is screwed into the attachment hole 71, whereby the level meter 10 is attached to the tank 70. For example, the user of the level meter 10 can screw the attachment screw 18 into the attachment hole 71 by rotating the nut-shaped attachment portion 17 with the leading end of the attachment screw 18 aligned with the attachment hole 71. The structure for attaching the level meter 10 to the tank 70 is not limited thereto. For example, the attachment hole 71 is not threaded, and a nut is separately screwed to the attachment screw 18 exposed to the inside of the tank 70, whereby the level meter 10 may be attached to the tank 70. Alternatively, the level meter 10 may be attached to a mounting bracket which is provided above the tank 70 with an upper surface of the tank 70 opened by using a nut and the attachment screw 18. Alternatively, the method of attaching the level meter 10 to the tank 70 is not limited to the screwing using the attachment screw 18, and the thread may not be formed on the outer peripheral surface of the sensor unit 16. For example, a flange may be provided on one or both of the level meter 10 and the tank 70, and the level meter 10 may be attached to the tank 70 by fixing the flange to the level meter 10 or the tank 70 with a bolt.

In FIG. 3, the longitudinal direction A of the level meter 10 in a state of being attached to the tank 70 is the same direction as the change direction of the level Y of the object 72.

The level meter 10 transmits a radio wave to be a transmission wave Tx from the measurement end 40 toward the object 72. Then, a reflection wave Rx resulting from reflection of the transmission wave Tx at the interface 74 of the object 72 is received by the measurement end 40. The level meter 10 calculates the level Y of the object 72 based on the transmission wave Tx and the reflection wave Rx. For example, in the case of performing the measurement using the time of flight (ToF) method, the level meter 10 calculates a distance YA from the measurement end 40 to the interface 74 based on the difference between the transmission wave Tx and the reflection wave Rx, and calculates the level Y based on the distance YA. For example, in a case where measurement is performed by a radar method using a frequency modulated continuous wave (FMCW), the level meter 10 calculates the distance YA from the measurement end 40 to the interface 74 based on a frequency of a waveform obtained by mixing the transmission wave Tx and the reflection wave Rx, and calculates the level Y based on the distance YA.

A connection cable 92 is connected to the connection portion 12 of the level meter 10. The connection cable 92 connects a control device 90 (such as a programmable controller) provided outside the tank 70 and the level meter 10. An analog signal indicating the level Y of the object 72 measured by the level meter 10 is transmitted to the control device 90 via the connection cable 92. The control device 90 controls the operation of the water injection device 78 according to the measured level Y.

Figure 4:
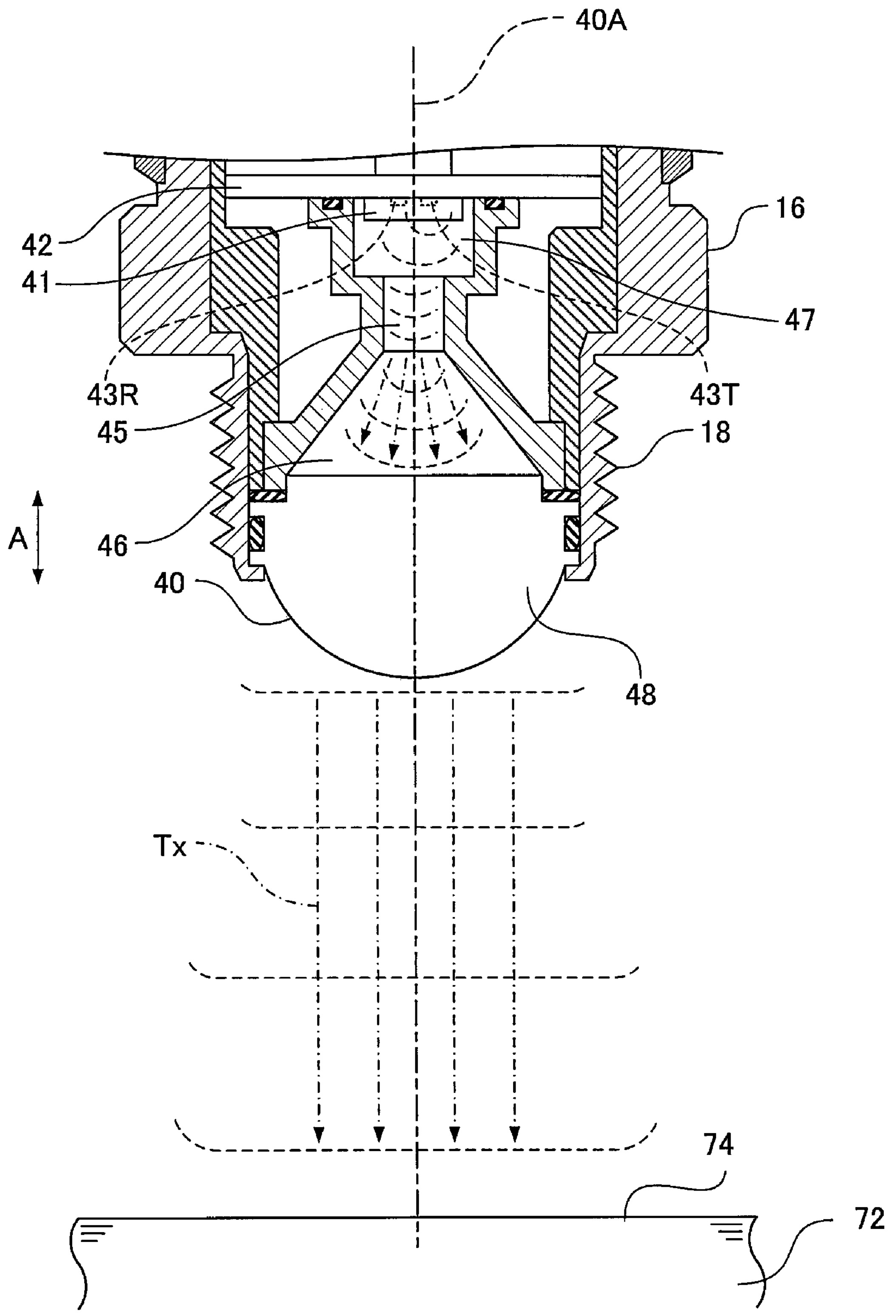
FIG. 4 is a view illustrating a traveling path of a transmission wave.
Figure 5:
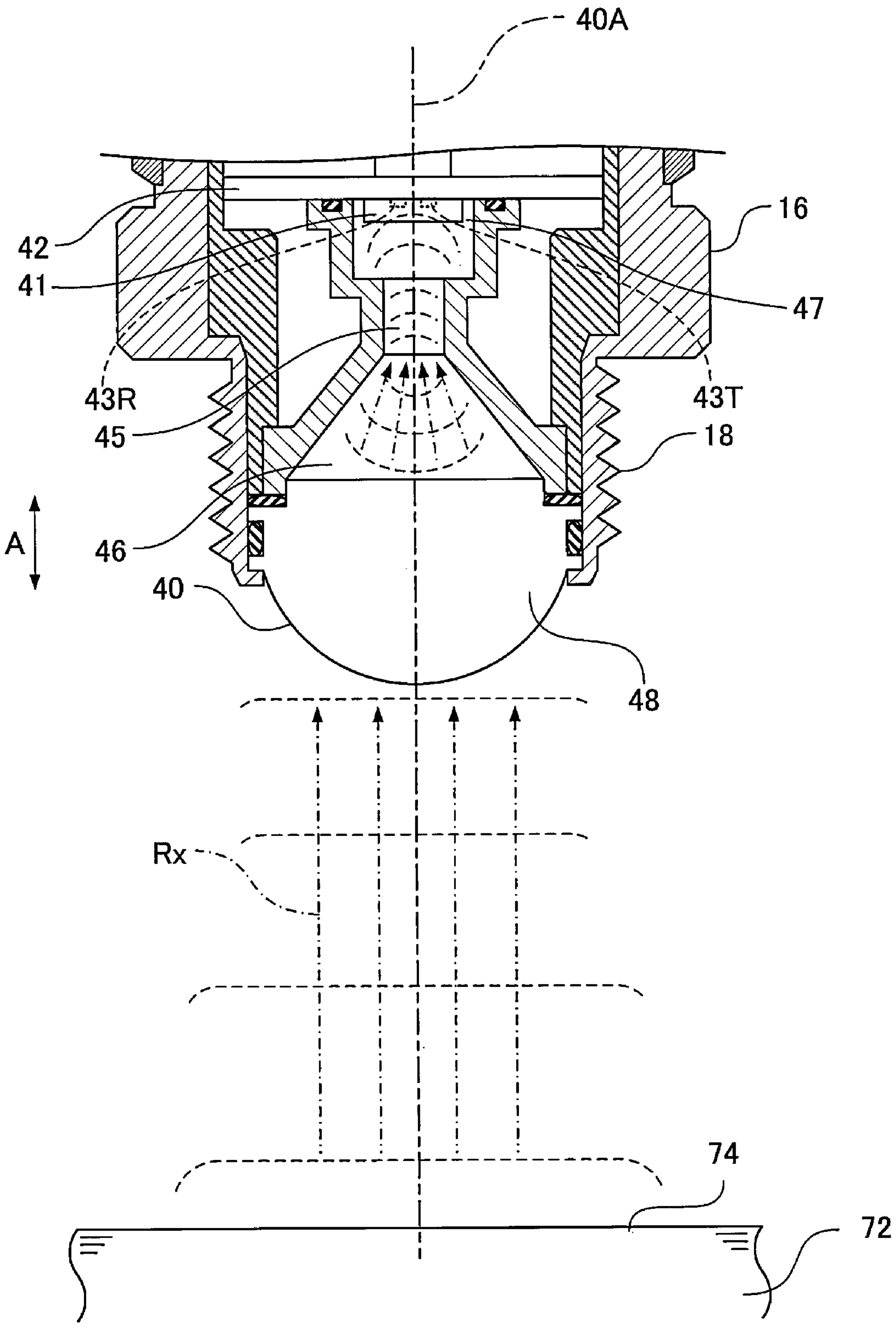
FIG. 5 is a view illustrating a traveling path of a reflection wave.

FIG. 4 is a view illustrating a traveling path of the transmission wave Tx. FIG. 5 is a view illustrating a traveling path of the reflection wave Rx. Referring to FIGS. 4 and 5, the transmission wave Tx is guided to the object 72 through the horn 46 and the dielectric lens 48, and the reflection wave Rx is guided to the reception unit 43R.

The sensor unit 16 includes a transmission unit 43T that transmits the transmission wave Tx and a reception unit 43R that receives the reflection wave Rx. Specifically, the sensor IC 41 disposed inside the sensor unit 16 includes the transmission unit 43T and the reception unit 43R. The transmission unit 43T and the reception unit 43R are a semiconductor electromagnetic wave generating device and a semiconductor electromagnetic wave receiving device mounted on a chip of the sensor IC 41, respectively.

A surrounding wall 47, a waveguide 45, a horn 46, and a dielectric lens 48 are provided between the transmission unit 43T and the object 72 in order of proximity to the transmission unit 43T. The surrounding wall 47 surrounds a space that includes the transmission unit 43T and the reception unit 43R on the sensor board 42 and communicates with the waveguide 45. The surrounding wall 47 has conductivity. The waveguide 45 is a hollow pipe formed of a conductor. The horn 46 is surrounded by a tapered wall surrounding a space communicating with the waveguide 45. The tapered wall of the horn 46 has conductivity. These are arranged such that the directions of the directivities of the waveguide 45 and the horn 46 coincide with the direction of an optical axis 40A of the dielectric lens 48. In FIGS. 4 and 5, the measurement end 40 is disposed such that the optical axis 40A is parallel to the longitudinal direction A (the length direction of the level meter 10). Hereinafter, the directions of the directivities of the waveguide 45 and the horn 46 may also be referred to as an optical axis 40A.

The transmission wave Tx transmitted from the transmission unit 43T passes through the space in the surrounding wall 47 and the waveguide 45, and then is incident on the dielectric lens 48 via the horn 46. In FIGS. 4 and 5, the equiphase surface of the radio wave is indicated by a broken line in the surrounding wall 47, in the horn 46, and below the measurement end 40. Note that, in the waveguide 45, the equiphase surface should originally be shown linearly, but a curved broken line bulging toward the traveling direction side (lower side in FIG. 4, upper side in FIG. 5) is shown in order to make the traveling direction of the radio wave easy to understand. The waveguide 45 converts the transmission wave Tx such that the transmission wave Tx becomes a spherical wave traveling in a spherical shape along the optical axis 40A from the emission end of the waveguide 45 regardless of the relative positional relationship between the transmission unit 43T and the waveguide 45. As a result, the emission end of the waveguide 45 can be regarded as a dot-liked transmission source. The diameter of the waveguide 45 may be set to a diameter that allows only the radio wave in the fundamental mode to pass through the waveguide 45 so that the emission end of the waveguide 45 becomes an ideal dot-like transmission source. On the other hand, when the diameter of the waveguide 45 is smaller than half the wavelength of the radio wave, the radio wave does not pass through the waveguide 45. For example, when the frequency of the radio wave is 50 GHz to 70 GHZ, the wavelength is about 4.3 mm to about 6.0 mm, and the half wavelength is about 2.15 mm to about 3.0 mm. In this case, when a diameter larger than 3 mm and smaller than 4.3 mm is selected as the diameter of the waveguide 45, only the radio wave in the fundamental mode can pass through the waveguide 45. The diameter of the waveguide 45 satisfying the above condition is, for example, 4 mm. When the dimension of the waveguide 45 in the direction along the optical axis 40A is short, even if the diameter of the waveguide 45 satisfies the above condition, radio waves other than the fundamental mode also pass through the waveguide 45. For example, the dimension of the waveguide 45 in the direction along the optical axis 40A may be set to a length equal to or longer than one wavelength of the wavelength of the radio wave. The longer the dimension of the waveguide 45 in the direction along the optical axis 40A, the longer the dimension of the level meter 10 in the longitudinal direction A. After passing through the waveguide 45, the transmission wave Tx travels as a spherical wave in the horn 46 and is converted into a plane wave by the dielectric lens 48.

As illustrated in FIG. 4, the transmission wave Tx travels as a spherical wave in the horn 46, and then the transmission wave Tx incident on the dielectric lens 48 is refracted between the horn 46 and the dielectric lens 48 and between the dielectric lens 48 and ambient air (atmosphere), and is guided in a direction parallel to the optical axis 40A. Since the optical axis 40A is parallel to the longitudinal direction A, the transmission wave Tx is guided in a direction in which one end (lower side) of the sensor unit 16 in the longitudinal direction A is directed, that is, in a direction of the object 72. The transmission wave Tx travels as a plane wave corresponding to the effective diameter of the dielectric lens 48 and a diffracted wave around the plane wave. The transmission wave Tx forms a radio wave beam having high directivity. Therefore, since the region of the detection target surface (the region on which the transmission wave Tx strikes in the interface 74 of the object 72) is narrowed, unnecessary reflection due to surrounding obstacles or the like is reduced.

The transmission wave Tx guided to the object 72 is reflected at the interface 74 of the object 72 and becomes a reflection wave Rx. As illustrated in FIG. 5, the reflection wave Rx traveling as a plane wave is received at the measurement end 40. The reflection wave Rx received by the measurement end 40 first enters the dielectric lens 48. The reflection wave Rx incident on the dielectric lens 48 is refracted between the ambient air and the dielectric lens 48 and between the dielectric lens 48 and the horn 46, and travels in the horn 46 as a spherical wave approaching the optical axis 40A. As a result, the reflection wave Rx is guided to the reception unit 43R as a radio wave emitted from a dot-liked transmission source at the end portion on the surrounding wall 47 side via the waveguide 45.

The waveguide 45, the horn 46, and the dielectric lens 48 arranged inside the sensor unit 16 guide the traveling direction of the radio wave to the direction of the optical axis 40A by each directivity with respect to the radio wave, and thus they exhibit strong directivity with respect to the radio wave as a whole by combining them. Therefore, even if the length direction dimension (length along the longitudinal direction A) is small, the sensor unit 16 can appropriately guide the transmission wave Tx and the reflection wave Rx by making the transmission wave Tx and the reflection wave Rx coaxial by the waveguide 45. In addition, by appropriately guiding the transmission wave Tx and the reflection wave Rx, the transmission of the transmission wave Tx and the reception of the reflection wave Rx can be performed by the common measurement end 40 even though the position of the transmission unit 43T and the position of the reception unit 43R are different in the sensor IC 41. Therefore, by using the waveguide 45, the horn 46, and the dielectric lens 48, the designer of the level meter 10 can reduce the dimension in the length direction of the level meter 10 including the sensor unit 16, and the dimension of the entire level meter 10 can be made compact.

Figure 6:
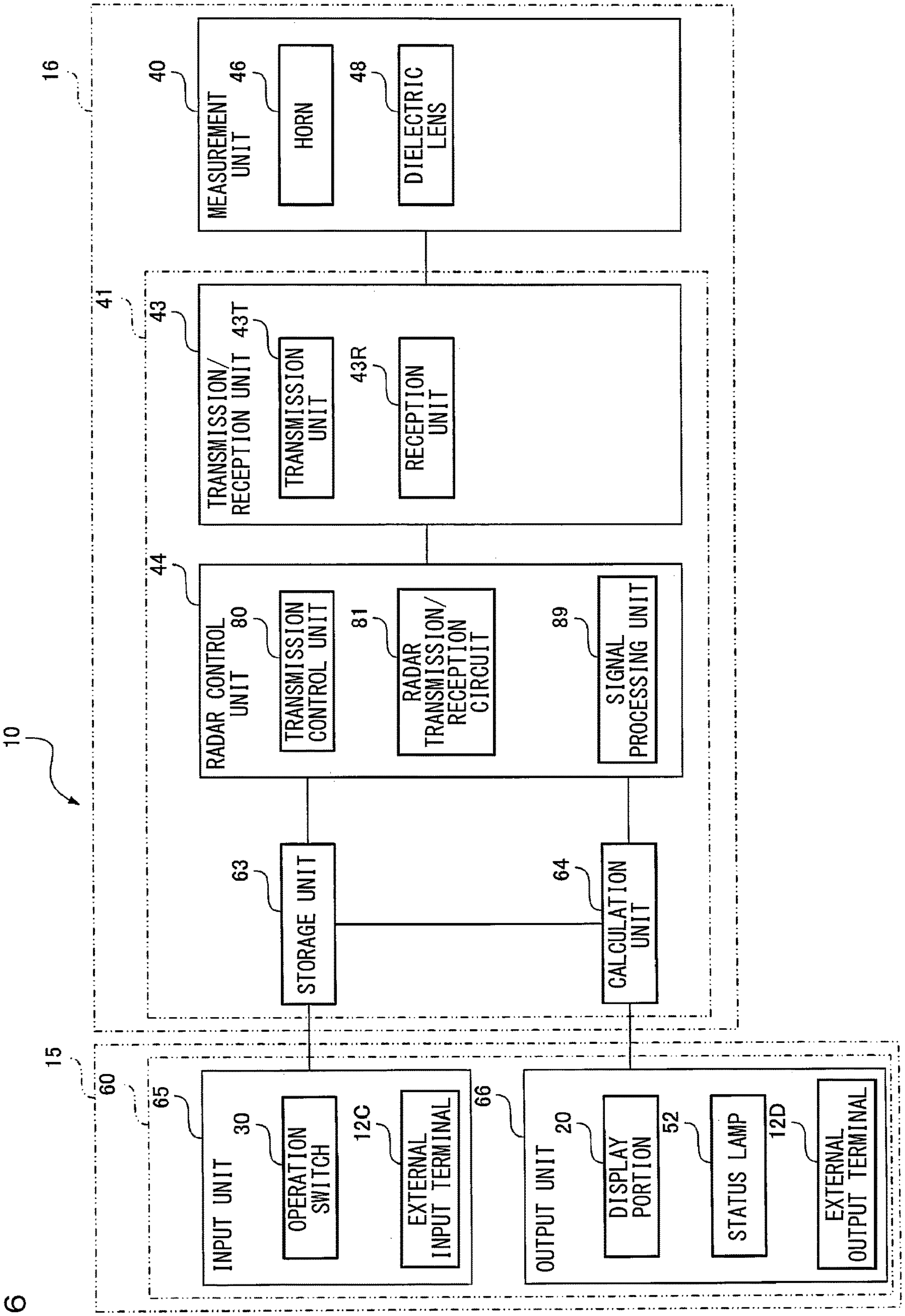
FIG. 6 is a block diagram illustrating an example of a relationship between components of the level meter.

Next, a relationship between the components of the level meter 10 is described with reference to FIG. 6. FIG. 6 is a block diagram schematically illustrating an example of a relationship between the components of the level meter 10. As illustrated in FIG. 6, the sensor IC 41 of the sensor unit 16 includes a transmission/reception unit 43, a radar control unit 44, a storage unit 63, and a calculation unit 64. The transmission/reception unit 43 includes a transmission unit 43T that transmits the transmission wave Tx and a reception unit 43R that receives the reflection wave Rx. The sensor IC 41 may include a plurality of ICs. For example, the sensor IC 41 may include an antenna-integrated MMIC and a microcomputer.

The radar control unit 44 includes a transmission control unit 80 that determines the waveform of the transmission wave Tx, a radar transmission/reception circuit 81 that performs mutual conversion between a digital signal and a radio wave, and a signal processing unit 89 that performs signal processing based on the transmission wave Tx and the reflection wave Rx. When the sensor IC 41 includes the antenna-integrated MMIC and the microcomputer, the antenna-integrated MMIC may include a portion (the transmission control unit 80 and the radar transmission/reception circuit 81) of the radar control unit 44 excluding the signal processing unit 89 and the transmission/reception unit 43, and the microcomputer may include the signal processing unit 89, the storage unit 63, and the calculation unit 64.

The storage unit 63 stores various setting values (data) related to the operation of the level meter 10. The calculation unit 64 performs various calculations relating to the operation of the level meter 10 based on the setting values stored in the storage unit 63, the signal processing result of the signal processing unit 89, and the like. The storage unit 63 includes a storage device such as a RAM or a ROM. The calculation unit 64 includes a processor such as a CPU. The storage unit 63 and the calculation unit 64 may be provided on the display board 60 in the casing 15. Alternatively, the storage units 63 and the calculation units 64 may be separately provided in the sensor unit 16 and the casing 15, respectively, and stored data and responsible arithmetic processing may be shared by the sensor unit 16 and the casing 15.

On the other hand, the display board 60 of the casing 15 includes an input unit 65 and an output unit 66. The input unit 65 is an interface circuit that inputs an input provided from the outside of the level meter 10 to the level meter 10 as a signal. The input provided from the outside of the level meter 10 is, for example, a user's operation on the operation switch 30, a control signal provided from an external device (such as the control device 90 or the like) via the external input terminal 12C, and the like. The input unit 65 causes the storage unit 63 to store, for example, flag information indicating that the operation switch 30 has been operated, and data such as a setting value provided via the external input terminal 12C.

The output unit 66 is an interface circuit that outputs a signal generated inside the level meter 10 to the outside. The output unit 66 changes, for example, the display content of the display portion 20, the lighting state of the status lamp 52, and the like according to the calculation result (such as the value of the level Y) by the calculation unit 64. In addition, the output unit 66 transmits the calculation result by the calculation unit 64 to an external device via the external output terminal 12D.

Figure 7:
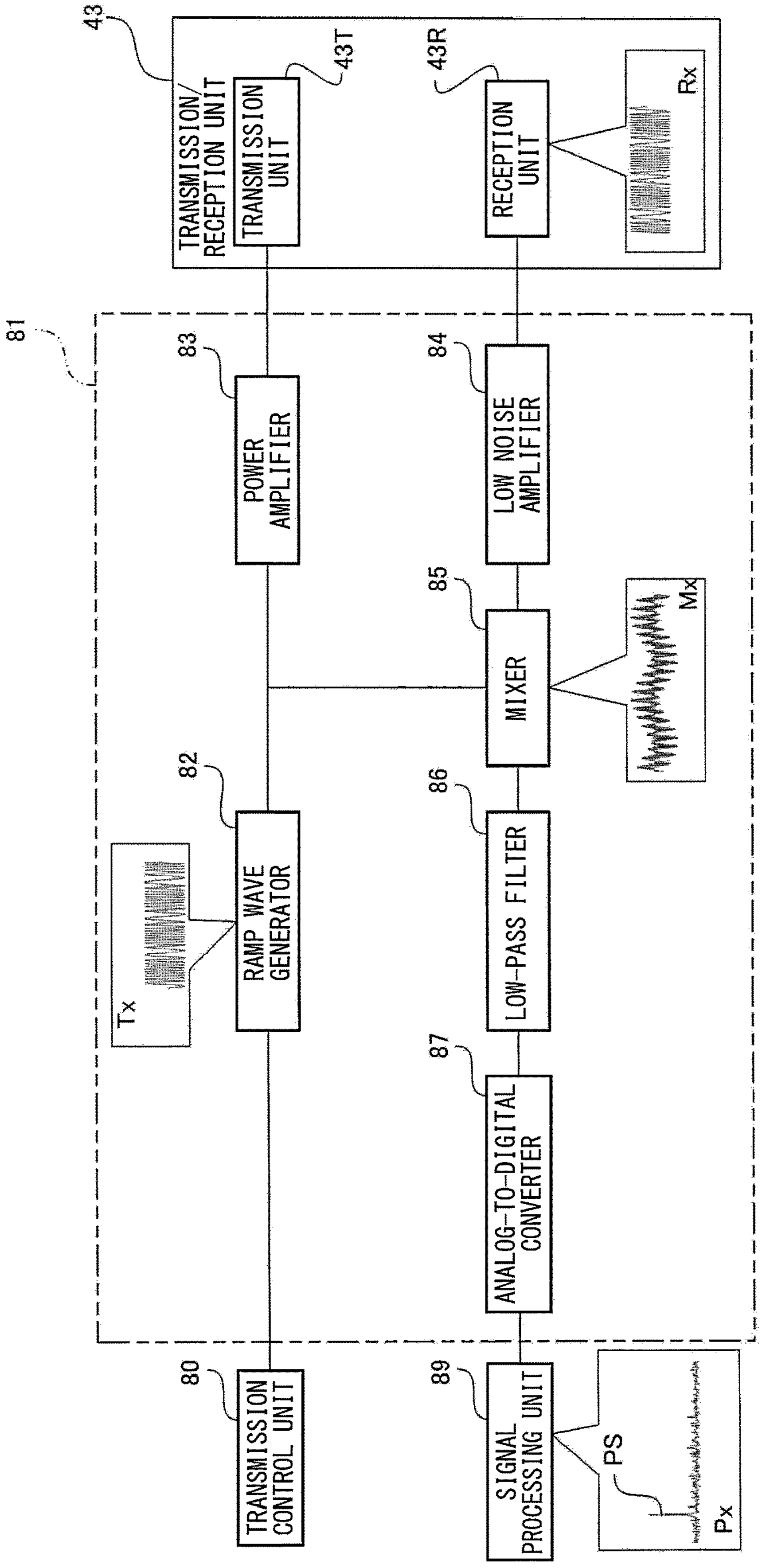
FIG. 7 is a view illustrating an example of a configuration of a radar control unit and a transmission/reception unit.
Figure 8:
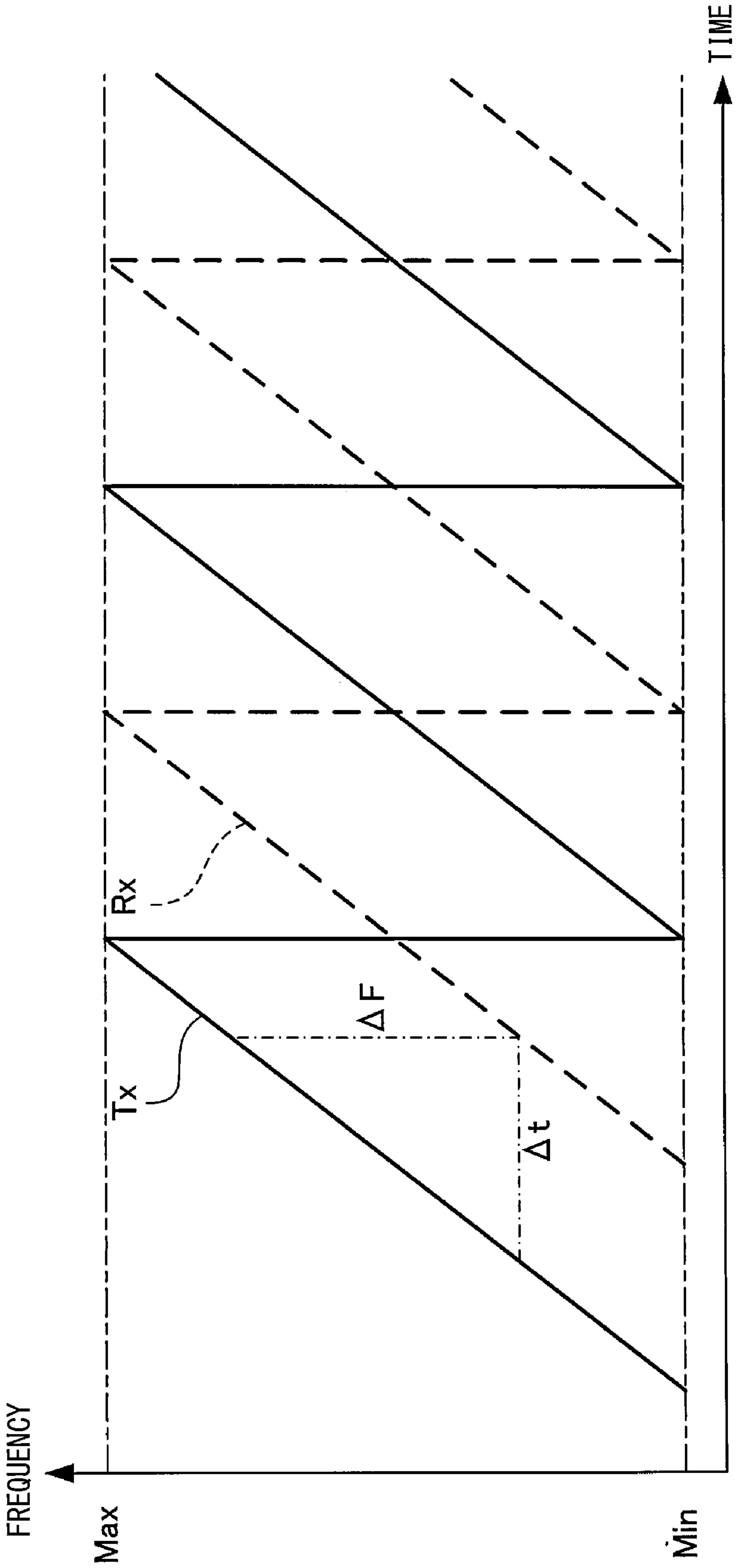
FIG. 8 is a view illustrating a relationship between a transmission wave and a reflection wave.

The measurement of the level Y by the level meter 10 is described in more detail with reference to FIGS. 7 and 8. FIG. 7 is a view illustrating an example of configurations of the radar transmission/reception circuit 81 and the transmission/reception unit 43 included in the sensor IC 41. FIG. 8 is a view illustrating a relationship between a transmission wave Tx and a reflection wave Rx.

As illustrated in FIG. 7, the radar transmission/reception circuit 81 includes a ramp wave generator 82, a power amplifier 83, a low noise amplifier 84, a mixer 85, a low-pass filter 86, and an analog-to-digital converter 87.

The level meter 10 of the present embodiment measures the level Y by a radar method using FMCW. The ramp wave generator 82 is connected to the transmission control unit 80. When receiving data indicating the waveform of the transmission wave Tx determined by the transmission control unit 80, the ramp wave generator 82 generates a transmission signal having the waveform of the transmission wave Tx according to the data. Here, as the waveform of the transmission wave Tx, a waveform that repeats increase and decrease in frequency is used.

FIG. 8 is a graph illustrating a change in frequency of the transmission wave Tx (and the reflection wave Rx) with respect to time. In FIG. 8, the frequency of the transmission wave Tx increases linearly with time from a minimum value (Min), and returns to the minimum value again when reaching a maximum value (Max). In this manner, the frequency of the transmission wave Tx repeatedly increases and decreases. The increasing/decreasing pattern of the frequency is not limited to this, and for example, a pattern may be used in which the frequency decreases linearly with time from the maximum value and returns to the maximum value again when reaching the minimum value. Alternatively, a pattern of repeating linear increase/decrease and decrease between the maximum value and the minimum value may be used. The transmission wave Tx used in the present embodiment is a radio wave in the 60 GHz band, and the minimum value of the frequency is, for example, 58 GHz and the maximum value is, for example, 69 GHz. The frequency band to be used is not limited thereto, and for example, a frequency of 77 GHz to 81 GHz may be used.

The transmission signal generated by the ramp wave generator 82 in FIG. 7 is amplified by the power amplifier 83 and sent to the transmission unit 43T. The transmission unit 43T generates a radio wave having a waveform corresponding to the transmission signal and transmits the radio wave as a transmission wave Tx to the object 72. The transmission wave Tx is reflected by the interface 74 of the object 72 to become a reflection wave Rx, and is received as a reception signal by the reception unit 43R. The reflection wave Rx is a wave out of phase with respect to the transmission wave Tx.

As indicated by a broken line in FIG. 8, the reflection wave Rx is a wave shifted from the transmission wave Tx by a time difference $\Delta t$. The time difference $\Delta t$ is a value corresponding to the distance YA (FIG. 3) from the measurement end 40 to the interface 74 of the object 72. Since the reflection wave Rx reciprocates between the measurement end 40 and the object 72, there is a relationship of $\Delta t = 2 \times YA/c$ where c is the speed of light.

Then, a frequency difference $\Delta F$ corresponding to the magnitude of the time difference $\Delta t$ is generated between the transmission wave Tx and the reflection wave Rx. There is a certain relationship between the frequency difference $\Delta F$ and the time difference $\Delta t$ depending on the waveform of the transmission wave Tx. The waveform of the transmission wave Tx is a waveform whose frequency linearly changes with the lapse of time. That is, there is a certain relationship between the frequency difference $\Delta F$ and the time difference $\Delta t$ according to the frequency change per unit time in the waveform of the transmission wave Tx. For example, the frequency of the transmission wave Tx increases linearly from the minimum value (Min) as time elapses, and reaches the maximum value (Max). In this case, the relationship between the frequency difference $\Delta F$ and the time difference $\Delta t$ is uniquely determined by the difference between the maximum value and the minimum value of the frequency of the transmission wave Tx, which is the bandwidth of frequency modulation, and the relationship of the frequency change with time. Therefore, the level meter 10 can calculate the time difference Δt based on the frequency difference ΔF that is a difference between the transmission wave Tx and the reflection wave Rx. Then, the level meter 10 can calculate the distance YA (Δt×c/2) from the time difference Δt. Further, the level meter 10 can calculate the value of the level Y based on the distance YA. Specifically, the difference between the depth of the tank 70 (the distance from the bottom of the tank 70 to the measurement end 40) and the distance YA is the value of the level Y. Further, since there is a certain relationship between the frequency difference ΔF and the time difference Δt depending on the waveform of the transmission wave Tx, the correspondence relationship between the frequency difference ΔF and the distance YA can be obtained in advance. The correspondence relationship between the frequency difference ΔF and the distance YA may be stored in advance in the storage unit 63 of FIG. 6.

As illustrated in FIG. 7, the reception signal corresponding to the reflection wave Rx received by the reception unit 43R is input to the mixer 85 via the low noise amplifier 84. A transmission signal corresponding to the waveform of the transmission wave Tx output from the ramp wave generator 82 is also input to the mixer 85, and the mixer 85 generates a signal corresponding to a mixed wave Mx obtained by mixing the waveforms of the transmission wave Tx and the reflection wave Rx. Specifically, the mixer 85 mixes the transmission signal and the reception signal to generate an IF signal (IF: intermediate frequency) corresponding to the mixed wave Mx.

The IF signal corresponding to the mixed wave Mx has a waveform including a high frequency component derived from the frequency of the 60 GHz band of the transmission wave Tx and the reflection wave Rx and a low frequency component corresponding to the frequency difference ΔF between the transmission wave Tx and the reflection wave Rx. The IF signal corresponding to the mixed wave Mx is input to the low-pass filter 86, and a low-frequency waveform according to the frequency difference ΔF is extracted. The extracted low-frequency waveform is input to the analog-to-digital converter 87. The analog-to-digital converter 87 converts a low-frequency waveform into a digital value and outputs the digital value to the signal processing unit 89.

The signal processing unit 89 converts the low-frequency waveform output from the analog-to-digital converter 87 into a frequency signal Px by fast Fourier transform frequency signal Px or the like. The frequency signal Px is a signal indicating the strength of the wave for each frequency, and a frequency corresponding to the maximum peak PS of the frequency signal Px is a frequency difference ΔF between the transmission wave Tx and the reflection wave Rx. The signal processing unit 89 transmits the frequency signal Px to the calculation unit 64 in FIG. 6.

The calculation unit 64 calculates the values of the distance YA and the level Y based on the frequency signal Px. In calculating the values of the distance YA and the level Y, the calculation unit 64 refers to the setting values stored in the storage unit 63. For example, the storage unit 63 stores a correspondence relationship between the frequency difference ΔF and the distance YA, a value (depth of the tank 70) for calculating the level Y from the distance YA, and the like.

Depending on the measurement environment, a peak other than the maximum peak PS may appear in the frequency signal Px due to an element other than the interface 74 of the object 72 (for example, a device such as a stirrer provided in the tank 70). Even if there are a plurality of peaks in the frequency signal Px, the calculation unit 64 can specify only the maximum peak PS derived from the object 72 by appropriately performing calculation. For example, the data of the frequency signal Px obtained in advance in a state where there is no object 72 (state where the tank 70 is empty) may be stored in the storage unit 63. The calculation unit 64 can specify the maximum peak PS derived from the object 72 by examining a difference between the frequency signal Px obtained in a state where the object 72 does not exist and the frequency signal Px obtained in a state where the object 72 exists.

After calculating the frequency difference ΔF corresponding to the maximum peak PS of the frequency signal Px, the calculation unit 64 calculates the values of the distance YA and the level Y based on the frequency difference ΔF and the setting value stored in the storage unit 63. The calculation unit 64 transmits the calculated value of the level Y to the output unit 66. The output unit 66 changes the display content of the display portion 20 and the lighting state of the status lamp 52 according to the value of the level Y. The value of the level Y is sent to the control device 90 (FIG. 3) through the external output terminal 12D. The output unit 66 may output a binary or multi-valued control signal based on the comparison result between the calculated value of the level Y and the threshold to the control device 90 through the external output terminal 12D. Alternatively, instead of the value of the level Y itself, a signal indicating that specific control according to the state of the level Y is to be executed may be sent to the control device 90. For example, when the level Y is above a certain threshold or below a certain threshold, a signal indicating that the operation of the pump, valve or the like should be changed may be sent to the control device 90.

Figure 9:
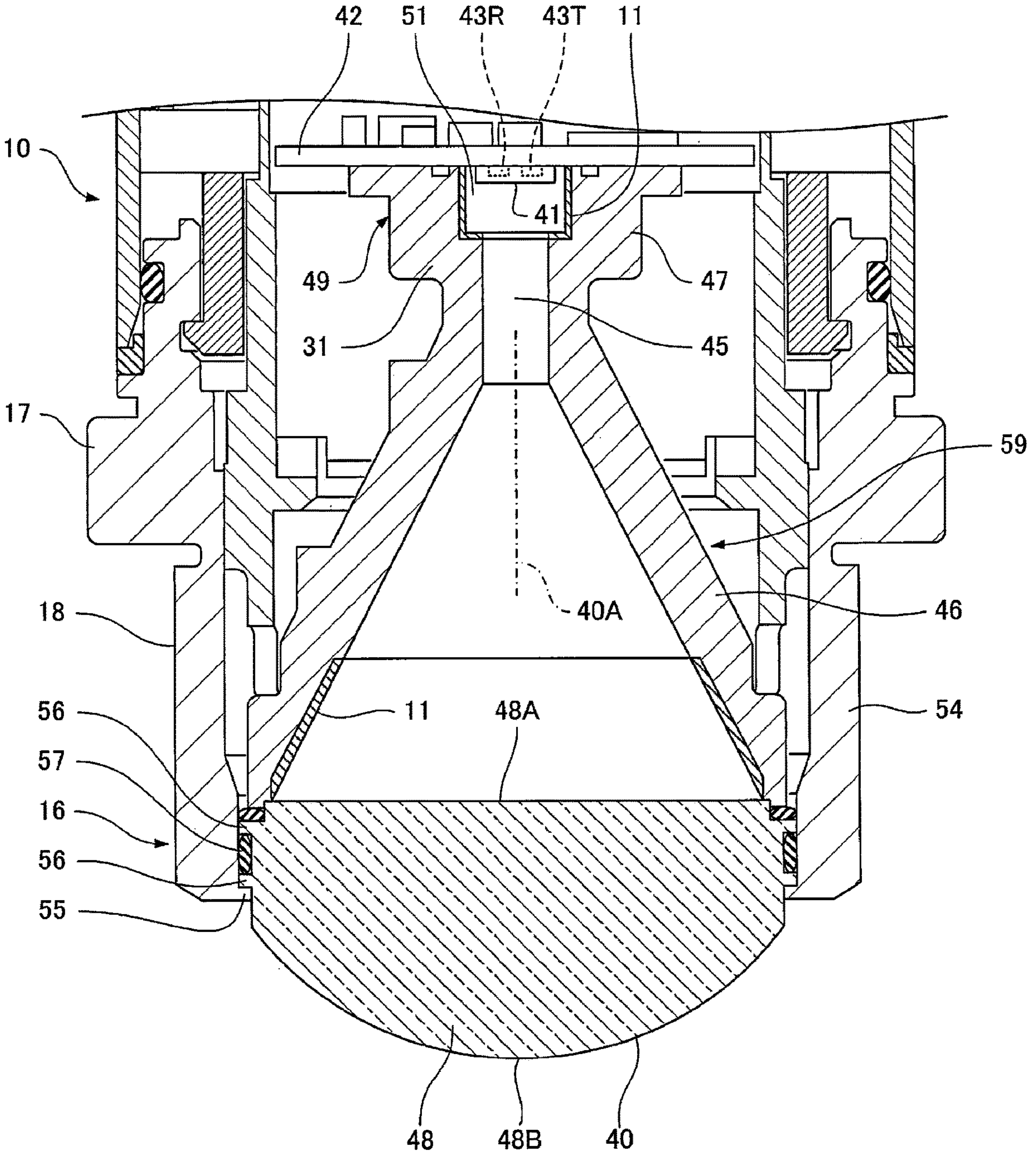
FIG. 9 is a longitudinal cross-sectional view of a main part of a first example of the level meter.

FIG. 9 illustrates a detailed internal structure of the sensor unit 16 of the level meter 10 of a first example of the embodiment according to the present invention. As illustrated in the drawing, an element case 49 is constituted by the surrounding wall 47. Although the shape of an internal space 51 of the element case 49 is arbitrary, the element case 49 illustrated in FIG. 9 is formed in a rectangular parallelepiped shape according to the shape of the sensor IC 41 accommodated in the internal space 51. Therefore, the surrounding wall 47 as the inner wall of element case 49 has four planar surfaces on the inner surface. The element case 49 has a bottom wall 31 as an inner wall at a portion to which the waveguide 45 as a waveguide is connected.

The dielectric lens 48 is made of a dielectric such as synthetic resin or glass. The element case 49, the waveguide 45, and the horn 46 are made of a member having moldability and radio wave reflectivity. Examples of such a member include a member obtained by subjecting an aluminum die-cast member to nickel plating, a member obtained by subjecting an aluminum shaving member to alumite treatment, a member obtained by subjecting a zinc die-cast member to nickel plating, a stainless steel member, and a member obtained by subjecting a resin such as ABS or a liquid crystal polymer to nickel plating.

In a casing 54 of the sensor unit 16, a radio wave shaping member 59 including an element case 49 that covers the internal space 51 including the sensor IC 41 mounted on the sensor board 42 and including the transmission unit 43T and the reception unit 43R, the waveguide 45, and the horn 46 is provided.

The radio wave transmitted from the transmission unit 43T of the sensor IC 41 is reflected by the element case 49 inside the sensor unit 16 and a surface 48A of the dielectric lens 48 facing the inside of the sensor unit 16. In the horn 46, the radio wave reflected on the surface 48A of the dielectric lens 48 is further reflected. The reflection wave becomes a stray signal wave and exists inside the sensor unit 16. In particular, the intensity of the radio wave reflected on the inner surface of the element case 49 is remarkably high.

On the inner surface of the bottom wall 31 and the inner surfaces of the four surrounding walls 47 constituting the element case 49, that is, at a position along the bottom wall 31 and the surrounding walls 47, a radio wave absorbing member 11 that absorbs a reflection wave that has become a stray signal wave is provided. As the radio wave absorbing member 11, any member can be used as long as it can absorb a reflection wave reflected from a portion other than the interface 74 of the object 72 illustrated in FIG. 3 in the radio wave transmitted from the transmission unit 43T of the sensor IC 41.

Specifically, a radio wave absorbing member using the dielectric loss principle, a radio wave absorbing member using the magnetic loss principle, and a radio wave absorbing member using the reflection loss principle can be exemplified. Examples of the radio wave absorber used for the radio wave absorbing member include a magnetic radio wave absorber, a dielectric radio wave absorber, and a conductive radio wave absorber.

As the illustrated radio wave absorbing member 11, a radio wave absorbing sheet can be suitably used. In the radio wave absorbing member 11 in the form of a radio wave absorbing sheet, a radio wave incident on the sheet from the front surface of the sheet is attenuated by passing through the sheet in the thickness direction, is reflected on the back surface of the sheet, and then passes in the thickness direction from the back surface side toward the front surface side of the sheet to be attenuated again, and a part the radio wave is transmitted through the front surface of the sheet and the remaining part is reflected on the front surface, and further passes through the sheet in the thickness direction to be attenuated repeatedly.

It is necessary to take measures so that radio waves can be reliably reflected on the back surface of the sheet. In a case where the element case 49 is made of a conductor such as aluminum as described above, reflection can be performed without any problem only by attaching the radio wave absorbing sheet directly to the element case 49, for example. On the other hand, in a case where the element case 49 is made of resin, it is necessary to reliably perform reflection by attaching a sheet-like conductor, that is, a shielding material to the back surface of the radio wave absorbing sheet. The radio wave absorbing sheet integrated with the sheet-like conductor can be attached to the element case 49 formed of a conductor together with the sheet-like conductor.

Examples of the material of the radio wave absorbing member 11 include a material obtained by adding a silicon carbide filler to a silicone base material, a material obtained by adding silicon carbide to ceramics and sintering the silicon carbide, a material obtained by adding silicon carbide to silicone grease to form a paste, and a material obtained by adding silicon carbide to a silicone adhesive to form a coating agent.

Specifically, the radio wave absorbing member 11 desirably has a low relative dielectric constant. Since the relative dielectric constant is low, it is possible to effectively prevent the radio wave that tries to enter the radio wave absorbing member 11 from being reflected on the surface of the radio wave absorbing member 11. For this purpose, practically, the radio wave absorbing member 11 is preferably a low dielectric constant material having a relative dielectric constant of 2 to 3. In addition, the radio wave absorbing member 11 desirably has a high dielectric loss tangent. Since the dielectric loss tangent is high, it is possible to effectively absorb and reduce a radio wave passing through the radio wave absorbing member 11, that is, the radio wave absorbing sheet, that is, a reflection wave that has become a stray signal wave.

From this viewpoint, the silicone-based materials and ceramics correspond to materials and base materials having low relative dielectric constant. On the other hand, silicon carbide corresponds to a material having a high dielectric loss tangent.

Examples of the material having a low relative dielectric constant include polypropylene, silicone, epoxy, urethane, chloroprene, and ceramics. Examples of the material having a high dielectric loss tangent include ferrite, silicon carbide, and titanium oxide. As described above, it is possible to preferably use an aspect in which a filler composed of a material having a higher dielectric loss tangent than the material having a low relative dielectric constant is mixed in a base material composed of a material having a low relative dielectric constant.

The sheet-like conductor attached to the back surface of the radio wave absorbing sheet is preferably made of aluminum foil, copper foil, carbon fiber, or the like. By being made of aluminum foil, copper foil, carbon fiber, or the like, it is possible to flexibly follow the shape of element case 49.

Figure 10:
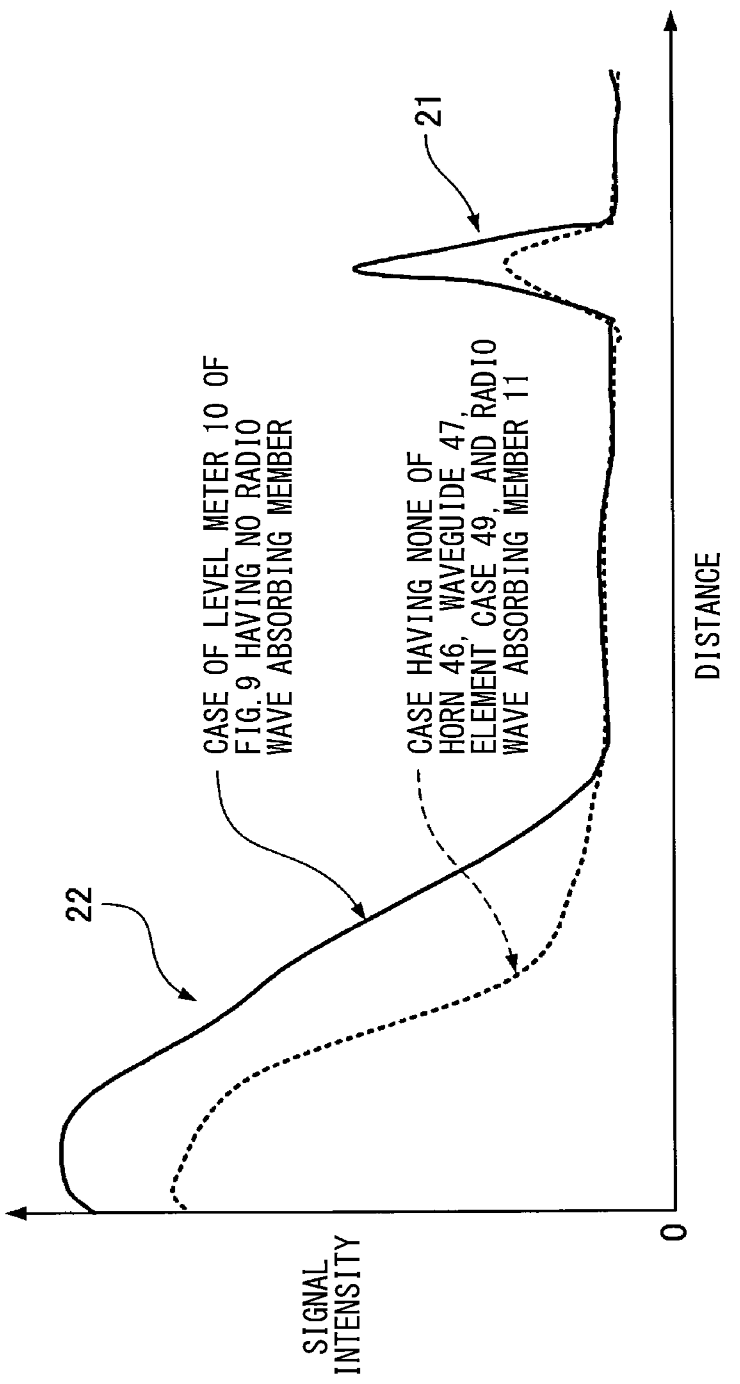
FIG. 10 is a view illustrating the intensity of a reflection wave that has become a stray signal and the intensity of a reflection wave from a target.

FIG. 10 is a graph illustrating the intensity of the reflection wave that has become the stray signal wave and the intensity of the reflection wave from the interface of the object. In FIG. 10, the horizontal axis represents the distance from the level meter 10, and the vertical axis represents the intensity of the signal detected by the level meter 10. In the drawing, similarly to the level meter 10 having the configuration illustrated in FIG. 9, a solid line indicates an example of a detection signal in a case where the sensor unit 16 includes the horn 46, the waveguide 45, and the element case 49, but does not include the radio wave absorbing member 11. In the drawing, a broken line indicates an example of a detection signal in a case where the sensor unit 16 includes none of the horn 46, the waveguide 45, the element case 49, and the radio wave absorbing member 11. As illustrated in the drawing, since the sensor unit 16 includes the horn 46, the waveguide 45, and the element case 49, the signal intensity is higher than that in a case where these are not included.

In FIG. 10, a pulsed detection signal 21 on the right side represents a detection signal for the surface, that is, the interface of the detection object. A portion where the signal intensity is high in the vicinity of the vertical axis in FIG. 10 represents a detection signal 22 due to detection of a reflection wave from other than the interface of the object, that is, a reflection wave that has become a stray signal wave. As illustrated in the drawing, the reflection wave that has become the stray signal wave has a higher signal intensity of the detection signal 22 at a position closer to the vertical axis, that is, the level meter 10. Then, the signal intensity of the detection signal 22 of the reflection wave that has become the stray signal wave is higher than the signal intensity of the detection signal 21 for the interface at a distance position close to the level meter 10 to some extent. In the region where the signal intensity of the detection signal 22 of the reflection wave that has become the stray signal wave is higher than that of the detection signal 21 of the interface, the detection signal 21 of the interface is buried in the detection signal 22 of the reflection wave that has become the stray signal, and thus, can no longer be detected. That is, when the interface of the object approaches the level meter 10 to some extent or more, it is no longer possible to detect the level of the interface.

Note that the signal intensity of the detection signal 21 for the interface increases as the interface approaches the level meter 10. This is because the intensity when the reflection wave from the interface is received by the level meter 10 increases as the interface approaches the level meter 10. In addition, the signal intensity of the detection signal 21 for the interface decreases as the relative dielectric constant of the detection object decreases. The relative dielectric constant of water is about 80, whereas the relative dielectric constant of cotton seed oil is 3.1. Therefore, in the level meter 10, the intensity of the detection signal 21 of the reflection wave from the interface is lower when the level of cotton seed oil is detected than when the level of water is detected.

Figure 11:
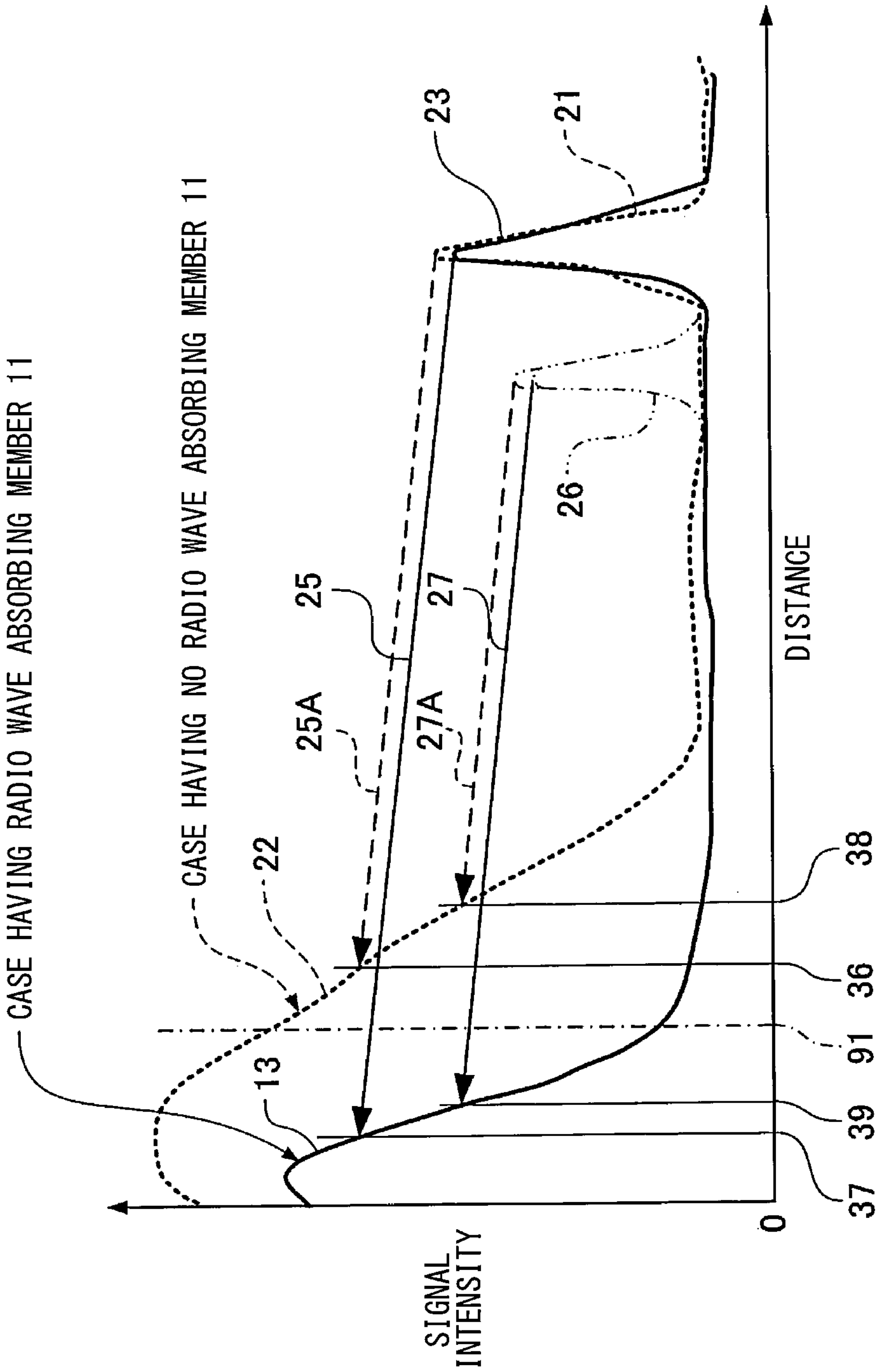
FIG. 11 is a view illustrating that the detection performance of the level of the interface of the object at a distance close to the level meter is improved.

FIG. 11 is a view illustrating, in the form of a graph, improvement of the detection performance of the level of the interface of the detection object at the distance close to the level meter 10 by mounting the radio wave absorbing member 11 on the element case 49 as illustrated in FIG. 9. Similarly to FIG. 10, the horizontal axis represents the distance from the level meter 10, and the vertical axis represents the intensity of the signal detected by the level meter 10. In the drawing, the signal intensity indicated by a broken line is similar to the signal intensity indicated by a solid line in FIG. 10. That is, similarly to the level meter 10 having the configuration illustrated in FIG. 9, a broken line in FIG. 11 indicates an example of a detection signal in a case where the sensor unit 16 includes the horn 46, the waveguide 45, and the element case 49, but does not include the radio wave absorbing member 11. In the drawing, a solid line indicates an example of the detection signal for the level meter 10 having the configuration illustrated in FIG. 9. That is, an example of the detection signal in a case where the sensor unit 16 includes all of the horn 46, the waveguide 45, the element case 49, and the radio wave absorbing member 11 will be described.

Comparing the detection signal in FIG. 11 with the solid line, that is, the detection signal in the case of including the radio wave absorbing member 11 and the detection signal with the broken line, that is, the detection signal in the case of not including the radio wave absorbing member 11, there is no large difference between the intensity of a detection signal 23 in the solid line in the case of including the radio wave absorbing member 11 and the intensity of the detection signal 21 in the broken line in the case of not including the radio wave absorbing member 11 at a position distant from the level meter 10, that is, at a position where the interface of the object exists. Specifically, the difference between the intensity of the detection signal 23 at the solid line interface in the case of including the radio wave absorbing member 11 and the intensity of the detection signal 21 at the broken line interface in the case of not including the radio wave absorbing member 11 is about 10 dB. On the other hand, at the position close to the level meter 10, the intensity of a detection signal 13 indicated by the solid line for the reflection wave that has become the stray signal wave in the case of including the radio wave absorbing member 11 is significantly lower than the intensity of the detection signal 22 indicated by the broken line for the reflection wave that has become the stray signal wave in the case of not including the radio wave absorbing member 11. The intensity difference reaches about 30 dB.

An arrow 25A in FIG. 11 indicates a change in the peak value of the detection signal 21 at the interface when the interface of the object approaches the level meter 10 in a case where the radio wave absorbing member 11 is not provided. An arrow 25 in FIG. 11 indicates a change in the peak value of the detection signal 21 at the interface when the interface of the object approaches the level meter 10 in a case where the radio wave absorbing member 11 is provided. The arrows 25A and 25 are inclined upward to the left in FIG. 11, which indicates that the intensity of the detection signal increases as the interface approaches the level meter 10 as described above. The distance from the level meter 10 corresponding to the point where the detection signal 22 indicated by the broken line and the arrow 25A intersect in the case where the radio wave absorbing member 11 is not provided represents a detection limit near distance 36 by the level meter 10 in the case where the radio wave absorbing member 11 is not provided. The distance from the level meter 10 corresponding to the point where the solid detection signal 13 and the arrow 25 intersect in the case of including the radio wave absorbing member 11 represents a detection limit near distance 37 by the level meter 10 in the case of including the radio wave absorbing member 11.

It is clearly illustrated that the detection limit near distance 37 by the level meter 10 in the case of including the radio wave absorbing member 11 is significantly closer to the level meter 10 as compared with the detection limit near distance 36 by the level meter 10 in the case of not including the radio wave absorbing member 11. That is, in a case where the radio wave absorbing member 11 is provided, the interface of the object can be detected at a distance closer to the level meter 10 than when the radio wave absorbing member 11 is not provided.

FIG. 11 also illustrates a detection signal 26 at the interface for another object having a relative dielectric constant lower than that of the object generating the detection signal 23 at the interface in a case where the radio wave absorbing member 11 is provided. For the sake of simplicity, it is assumed that the detection signal 26 represents both a detection signal in a case where the radio wave absorbing member 11 is not provided and a detection signal in a case where the radio wave absorbing member 11 is provided. However, since the peak value of the detection signal in a case where the radio wave absorbing member 11 is not provided and the peak value of the detection signal in a case where the radio wave absorbing member 11 is provided are different by about 10 dB as described above, only the difference, that is, the difference between the peak values of both is illustrated in FIG. 11.

An arrow 27A in FIG. 11 indicates a change in the peak value of the detection signal 26 at the interface when the interface of the object approaches the level meter 10 in a case where the radio wave absorbing member 11 is not provided. In a case where the radio wave absorbing member 11 is not provided, the distance from the level meter 10 corresponding to the point at which the detection signal 22 obtained by detecting the reflection wave that has become the stray signal wave intersects the arrow 27A represents a detection limit near distance 38 by the level meter 10 in a case where the radio wave absorbing member 11 is not provided. An arrow 27 in FIG. 11 indicates a change in the peak value of the detection signal 26 at the interface when the interface of the object approaches the level meter 10 in a case where the radio wave absorbing member 11 is provided. In a case where the radio wave absorbing member 11 is provided, the distance from the level meter 10 corresponding to the point where the solid detection signal 13 and the arrow 27 intersect due to the detection of the reflection wave that has become the stray signal wave represents a detection limit near distance 39 by the level meter 10 in a case where the radio wave absorbing member 11 is provided.

The change in the peak value of the detection signal 26 in a case where the interface of another object having a low relative dielectric constant described above is detected is lower in signal intensity than the change in the peak value of the detection signal 23 in a case where the interface of an object having a non-low relative dielectric constant is detected. However, also in this case, it is clearly illustrated that the detection limit near distance 39 by the level meter 10 in the case of including the radio wave absorbing member 11 is significantly closer to the level meter 10 as compared with the detection limit near distance 38 by the level meter 10 in the case of not including the radio wave absorbing member 11. That is, in a case where the radio wave absorbing member 11 is provided, even when an interface of another object having a low relative dielectric constant is detected, the interface of the object can be detected at a distance closer to the level meter 10 than when the radio wave absorbing member 11 is not provided. That is, detection stability at a distance close to the level meter 10 is improved.

In particular, in the example illustrated in FIG. 11, in the case of detecting the interface of another object having a low relative dielectric constant described above on the basis of the characteristics of the detection signal 13 indicated by the solid line for the reflection wave that is the stray signal wave in the case of including the radio wave absorbing member 11 and the detection signal 22 indicated by the broken line for the reflection wave that is the stray signal in the case of not including the radio wave absorbing member 11 at the position close to the level meter 10, the difference between the detection limit near distance 39 by the level meter 10 in the case of including the radio wave absorbing member 11 and the detection limit near distance 38 by the level meter 10 in the case of not including the radio wave absorbing member 11 is further increased as compared with the case of detecting the interface of the object having a non-low relative dielectric constant. That is, in the case of detecting an interface of another object having a low relative dielectric constant, detection stability at a distance close to the level meter 10, in other words, detection performance at a near distance is further improved as compared with the case of detecting an interface of an object having a non-low relative dielectric constant.

This is because, as illustrated in FIG. 11, the detection signals 13 and 22 for the reflection wave that has become the stray signal wave at the position close to the level meter 10 exist up to a distance farther from the level meter 10 as the signal intensity is lower.

Therefore, in a case where the tank 70 as the container illustrated in FIG. 3 stores oils, pellet-like resin, or the like, when the level is detected, the level up to the vicinity of the top plate of the tank 70 can be reliably detected.

The attachment of the radio wave absorbing member 11 to the horn 46 will be described.

As described above, the intensity of the reflection wave from the dielectric lens 48 is lower than the intensity of the reflection wave from the element case 49. Therefore, even in a case where the level meter 10 is small and the reflection wave from the dielectric lens 48 becomes a stray signal wave, the metallic inner surface of the horn 46 may be exposed as long as the detection of the reflection wave from the interface of the object by the sensor IC 41 is not substantially adversely affected.

However, in a case where the level meter 10 is not small, there is a high possibility that the reflection wave from the dielectric lens 48 substantially adversely affects the detection of the reflection wave from the interface of the object by the sensor IC 41. In such a case, as illustrated in FIG. 9, it is preferable to attach the radio wave absorbing member 11 also to the inner periphery of the portion of the horn 46 close to the surface 48A of the dielectric lens 48. The range in which the radio wave absorbing member 11 is preferably mounted is, for example, a range of 5 to 15 mm in the vertical direction from the dielectric lens 48 in a case where the diameter of the dielectric lens 48 is 37 mm. The sheet-like radio wave absorbing member 11 can be attached to the inner peripheral surface of the horn 46 by, for example, an acrylic double-sided adhesive tape.

Further, when the radio wave absorbing member 11 is installed in a too wide range, the radio wave absorbing member 11 largely absorbs even the reflection wave from the interface of the object, and conversely, the level of the interface cannot be accurately detected. From such a viewpoint, it is desirable that the installation range of the radio wave absorbing member 11 be considered according to, for example, the magnitude of the S/N ratio.

Figure 12:
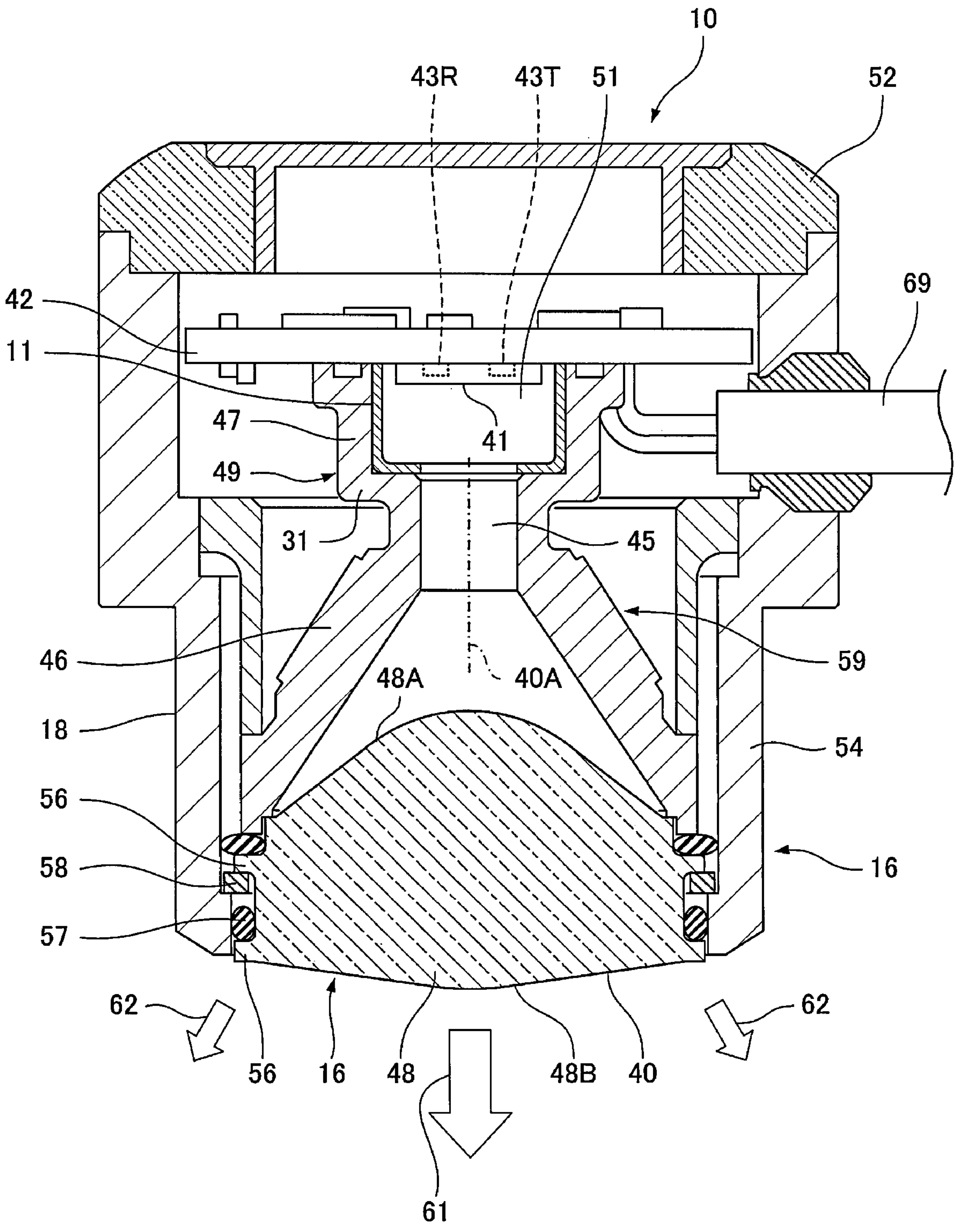
FIG. 12 is a longitudinal cross-sectional view of a main part of a second example of the level meter.

FIG. 12 illustrates a detailed internal structure of the sensor unit 16 of the level meter 10 of a second example of the embodiment according to the present invention. Here, since a low dielectric constant member is used instead of the metal member in the attachment structure of the dielectric lens 48 to the metal casing 54 in the sensor unit 16, generation of a reflection wave from the attachment structure is prevented. Furthermore, since the dielectric lens 48 is formed of a specific material, a reflection wave passing through the dielectric lens 48 is absorbed and reduced.

A structure for attaching the dielectric lens 48 to the metal casing 54 will be described. In the level meter 10 of the first example illustrated in FIG. 9, an inner flange 55 is integrally formed at the lower end, that is, the open end of the metallic casing 54 of the sensor unit 16. On the other hand, a pair of outer flanges 56 and 56 is integrally formed on the edge of the dielectric lens 48 along the direction of the optical axis 40A. The dielectric lens 48 is inserted into the casing 54 downward from the opening at the upper end of the casing 54, and the lower outer flange 56 hits the inner flange 55 of the casing 54, whereby the dielectric lens 48 is positioned and fixed inside the casing 54. A packing 57 such as an O-ring for sealing between the dielectric lens 48 and the casing 54 is provided between the pair of outer flanges 56 and 56. However, in this configuration, since the metallic inner flange 55 is in contact with the outer flange 56 of the dielectric lens 48, there is a concern about generation of a reflection wave that becomes a stray signal wave from the metallic inner flange 55 of the casing 54.

On the other hand, in the level meter 10 of the second example illustrated in FIG. 12, an attachment member 58 formed of a low dielectric constant member is provided. The attachment member 58 is hooked on one outer flange 56 of the dielectric lens 48 and is hooked on an appropriate portion in the casing 54, thereby fixing the dielectric lens 48 in a state of being positioned with respect to the casing 54.

With such a configuration, since the attachment member 58 formed of a low dielectric constant member is in contact with the outer flange 56 of the dielectric lens 48, it is possible to reduce a reflection wave that becomes a stray signal generated on the contact surface between the outer flange 56 of the dielectric lens 48 and the attachment member 58 as compared with a reflection wave that becomes a stray signal wave generated on the contact surface between the outer flange 56 of the dielectric lens 48 and the metallic inner flange 55.

In order to reduce generation of a reflection wave that becomes a stray signal wave from the dielectric lens 48, the dielectric lens 48 is preferably formed of a high dielectric loss tangent member. As the high dielectric loss tangent member therefor, a polychlorotrifluoroethylene (PCTFE) resin is particularly preferably used. Since the dielectric lens 48 is formed of the high dielectric loss tangent member, the radio wave passing through the dielectric lens 48 is effectively attenuated. In particular, since a polychlorotrifluoroethylene (PCTFE) resin is a high dielectric loss tangent member and a low dielectric constant member, it is possible to obtain an effect of reducing a reflection wave that becomes a stray signal wave by reducing the reflectance of a radio wave.

Since the dielectric lens 48 is formed of the high dielectric loss tangent member, the original transmission wave toward the interface of the object and the original detecting reflection wave that is reflected by the interface of the object and then enters the sensor unit 16 are slightly attenuated. However, compared with the disadvantage of attenuation, reducing the generation of a reflection wave that becomes a stray signal wave brings about a better result in detection by the sensor unit 16.

In the sensor unit 16 of the level meter 10 of the second example of the embodiment according to the present invention illustrated in FIG. 12, the cross-sectional shape of the dielectric lens 48 is suitable for reducing the side lobe. Specifically, the transmission wave incident on the dielectric lens 48 from the transmission unit 43T of the sensor IC 41 and transmitted through the dielectric lens 48 includes a main lobe 61 traveling toward the interface of the object through the central portion of the dielectric lens 48 and a side lobe 62 diverging to the periphery of the level meter 10 through the peripheral portion of the dielectric lens 48. The side lobe 62 is a noise component having a low intensity caused by leakage or diffraction of a transmission wave, but always occurs. When generated, the side lobe 62 becomes a reflection wave from a surrounding structure in the tank 70 to which the level meter 10 is attached as illustrated in FIG. 3. That is, the reflection wave that becomes a stray signal wave from the region close to the level meter 10 is caused.

In order to reduce the side lobes 62, the dielectric lens 48 has a protruding cross-sectional shape in which the surface 48A facing the inside of the horn 46 protrudes toward the waveguide 45. Then, in the dielectric lens 48, a surface 48B facing the outside of the level meter 10 is formed relatively flat as compared with the surface 48A facing the inside of the horn 46. This is different from that, in the dielectric lens 48 of the level meter 10 of the first example illustrated in FIG. 9, the surface 48A on the waveguide 45 side has a flat end, and the surface 48B facing the outside of the level meter 10 has a protruding cross-sectional shape.

Figure 13:
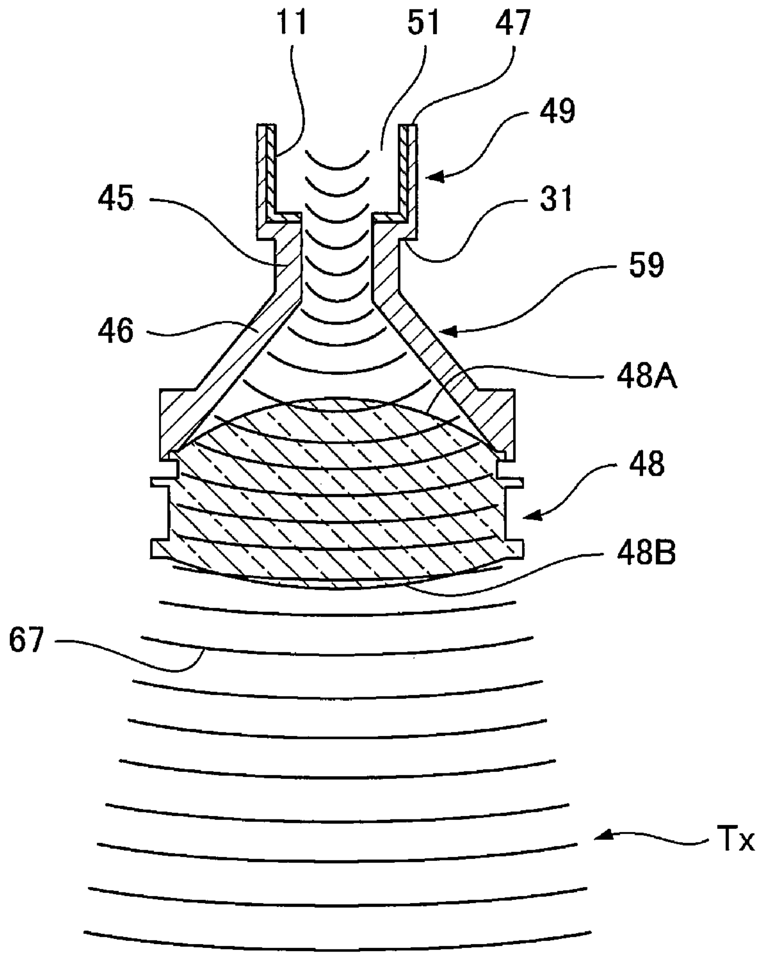
FIG. 13 is a view illustrating a collimated state of a transmission wave from the level meter of FIG. 12.
Figure 14:
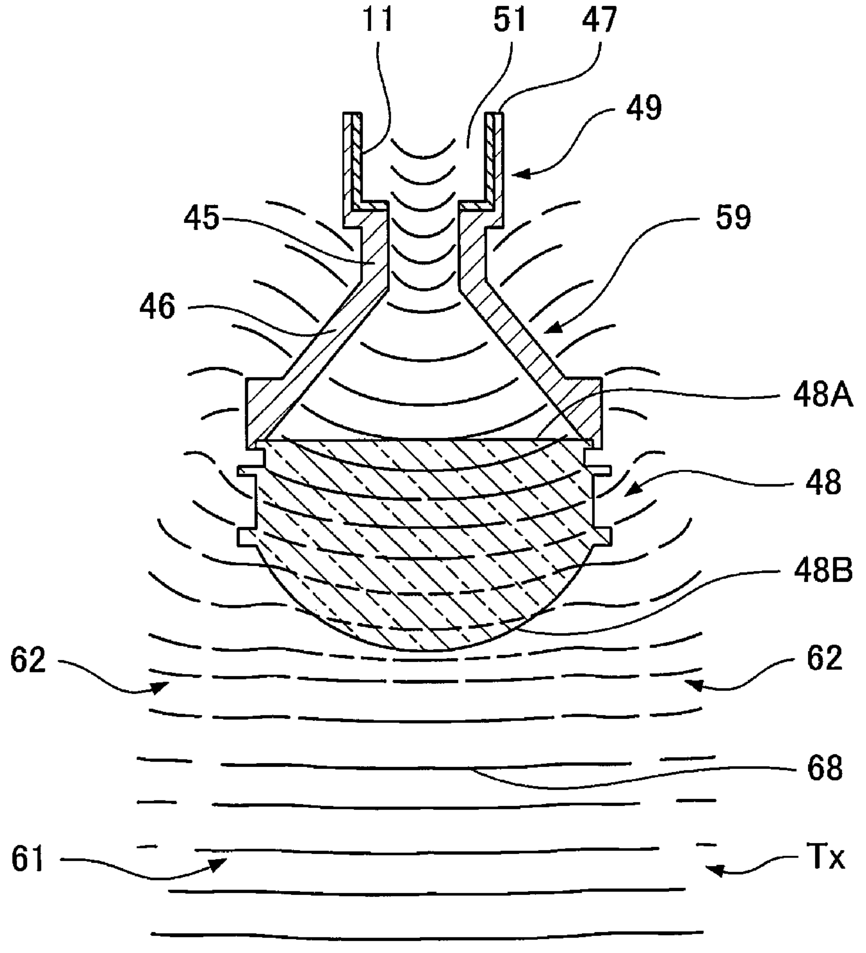
FIG. 14 is a view illustrating a state of a transmission wave from the level meter in a case where a dielectric lens does not include a convex portion protruding toward a waveguide.

FIG. 13 illustrates a state of a wavefront 67 of the transmission wave Tx when the dielectric lens 48 illustrated in FIG. 12 is used. FIG. 14 illustrates a state of a wavefront 68 of the transmission wave Tx when the dielectric lens 48 illustrated in FIG. 9 is used. In FIG. 14, the side lobes 62 are clearly seen. On the other hand, in FIG. 13, generation of side lobes is not observed.

That is, according to the dielectric lens 48 illustrated in FIG. 12, it is possible to reduce the intensity of signals derived from components other than the main lobe 61. As a result, the generation of the reflection wave from the region close to the level meter 10 can be reduced, and the reflection wave that causes a stray signal wave from the region close to the level meter 10 can be prevented from entering the level meter 10.

Although not illustrated, the surfaces 48A and 48B of the dielectric lens 48 are not smooth surfaces but surfaces having fine irregularities, for example, so that it is possible to reduce generation of a reflection wave from a region close to the level meter 10 that causes a stray signal in the same manner.

By adopting the configuration illustrated in FIG. 12, particularly in the small level meter 10, even if the radio wave absorbing member 11 is not attached to the inner periphery of the horn 46 as described above, the generation of the reflection wave that causes a stray signal wave can be reduced.

FIG. 12 illustrates a small level meter 10. The small level meter 10 illustrated in FIG. 12 is different from the non-small level meter 10 illustrated in FIG. 1 and the like in that the display portion 20 and the rotation mechanism 19 for the display portion 20 are not provided. Instead, in the small level meter 10 of FIG. 12, the display portion is installed at a position away from the level meter 10 in a form separated from the level meter 10. FIG. 12 illustrates a small level meter 10 and a cable 69 for transmitting a signal or the like to a display portion (not illustrated). Then, in the small level meter 10 illustrated in FIG. 12, only the status lamp 52 is installed.

In FIG. 11, the position on the vertical axis is the installation position of the level meter 10. In a case where the level meter 10 is installed at the position of the top plate of the tank 70 as illustrated in FIG. 3, the position of the top plate of the tank 70 is the position of the vertical axis in FIG. 11. On the other hand, a case where the level meter 10 is moved upward from the top plate of the tank 70 and installed will be described below.

In this case, the top plate of the tank 70 is located at a distance 91 from the vertical axis, that is, the level meter 10. At this distance 91, as illustrated, the detection signal 13 of the reflection wave that causes a stray signal is at a much lower level than the detection signals 23 and 26 at the interface.

That is, by changing the position of the level meter 10 to a position above the top plate of the tank 70, the detection limit near distance can be brought close to the top plate of the tank 70 illustrated in FIG. 3. That is, in the tank 70, the level of the interface 74 up to the position in the vicinity of the top plate can be accurately detected without any trouble. Therefore, for example, a change in the level of the interface 74 in the small tank 70 can be accurately detected over a wide range.

Figure 15:
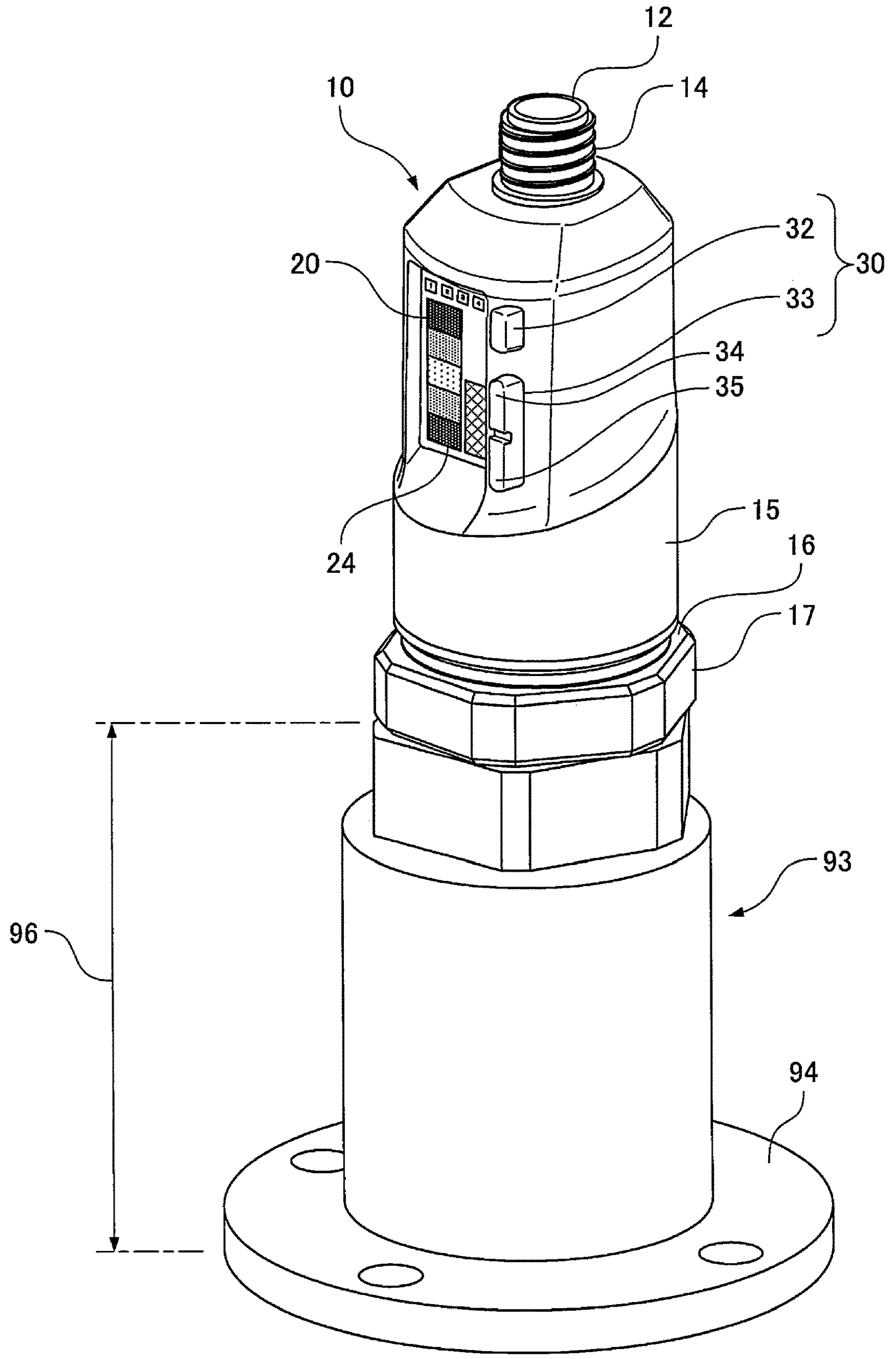
FIG. 15 is a stereoscopic view illustrating a state in which the level meter is attached to an adapter.
Figure 16:
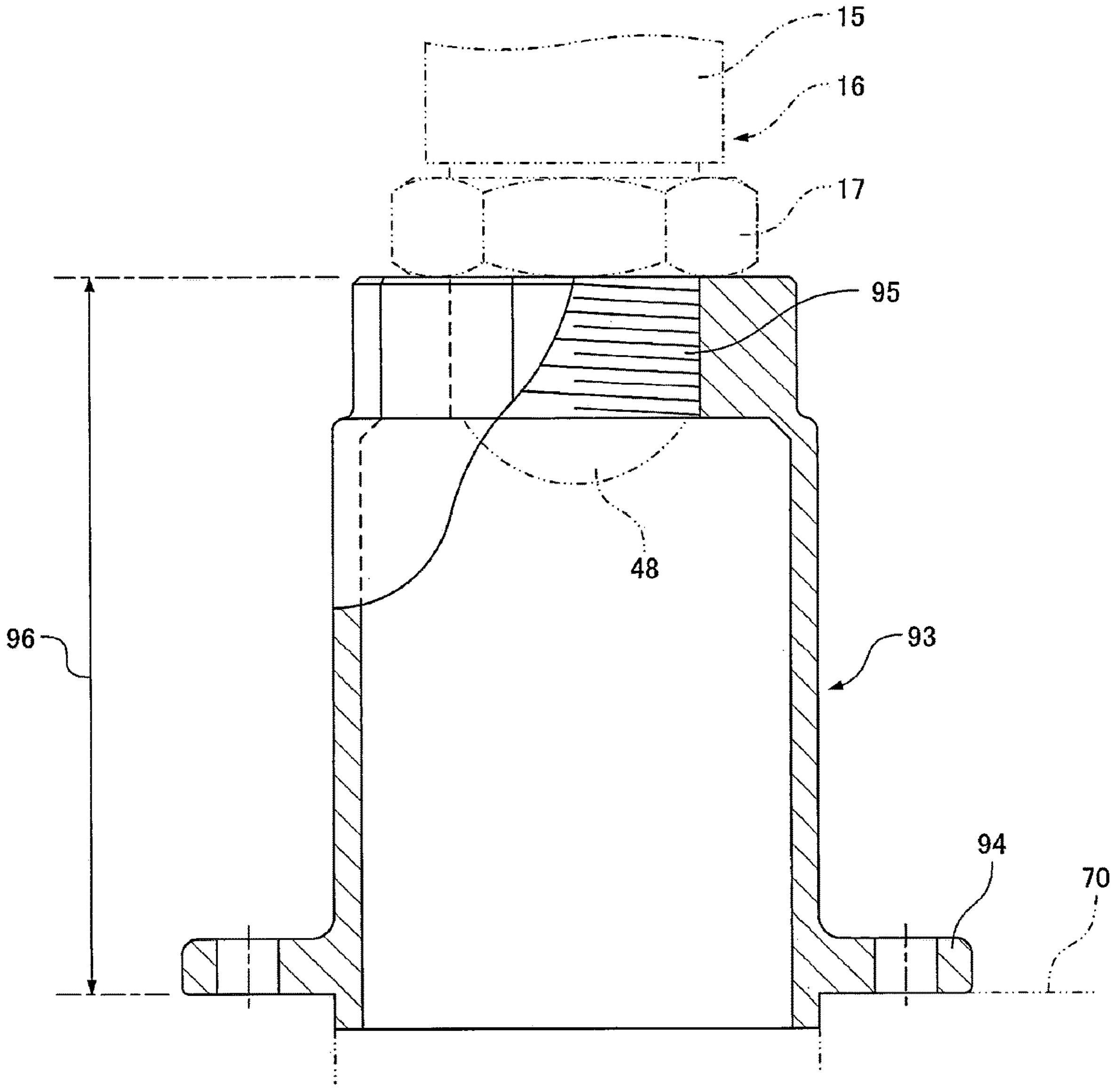
FIG. 16 is a cross-sectional view illustrating a state in which the level meter is attached to the adapter.

FIGS. 15 and 16 illustrate an example of an adapter 93 suitable for moving or installing the level meter 10 to a position above the top plate of the tank 70. The adapter 93 is formed in a cylindrical shape and has a flange 94 at the lower end for attaching the adapter 93 to the top plate of the tank 70. An inner screw 95 for fixing the level meter 10 to the adapter 93 is formed in a penetrating state in an upper end of the adapter 93 by screwing the connection screw portion 14 of the level meter 10.

By providing the adapter 93, the sensor board 42 on which the sensor IC 41 including a reception unit 43T is mounted in the level meter 10 is moved from the top plate of the tank 70, that is, from the vertical axis of the solid line drawn in FIG. 11 to the left side in FIG. 11. The amount of movement corresponds to a height 96 of the adapter 93.

In each of the examples shown in FIGS. 9 to 16, technical features of other examples can be captured for each example to the extent possible.

What is claimed is:

1. A level meter comprising:

a substrate on which a transmitter and a receiver are mounted;

a radio wave shaping member including an element case that covers an internal space including the transmitter and the receiver mounted on the substrate, a waveguide forming a first radio wave path and having one end that electromagnetically communicates with the internal space of the element case, and a horn having a second radio wave path gradually expanding from an other end of the first radio wave path of the waveguide toward a traveling direction of a transmission radio wave;

a dielectric lens that is provided at a leading end of the horn and deflects a radio wave from the transmitter via the radio wave shaping member to an object; and a radio wave absorbing member that is provided along an inner wall of the element case and absorbs radio waves, wherein the element case, the waveguide, and the horn are arranged such that:

a transmission wave from the transmitter passes through the internal space of the element case, the first radio wave path of the waveguide, the second radio wave path of the horn, and the dielectric lens in this order; and a reception wave reflected by the object and passing through the dielectric lens passes through the second radio wave path, the first radio wave path, and the internal space in this order to reach the receiver.

2. The level meter according to claim 1, wherein the radio wave absorbing member is provided along an inner wall of the horn.

3. The level meter according to claim 1, comprising:

a metal casing that accommodates a substrate, a radio wave shaping member, and a dielectric lens; and an attachment member formed of a dielectric for attaching the dielectric lens to the metal casing in contact with the dielectric lens.

4. The level meter according to claim 1, wherein the dielectric lens is formed of a lens material including a low dielectric constant material having a relative dielectric constant of 2 to 3 and a high dielectric loss tangent material having a dielectric loss tangent higher than that of the low dielectric constant material.

5. The level meter according to claim 4, wherein the high dielectric loss tangent material is a polychlorotrifluoroethylene resin.

6. The level meter according to claim 1, wherein the waveguide includes a waveguide tube, and coaxially couples a transmission wave from the transmitter and a reception wave to the receiver.

7. The level meter according to claim 1, wherein the dielectric lens has a protruding cross-sectional shape protruding toward the waveguide.

8. The level meter according to claim 1, comprising:

a casing that accommodates a substrate, a radio wave shaping member, and a dielectric lens, the casing being capable of being attached to a container that stores a substance having fluidity; and an adapter attached to the container and capable of attaching the casing, wherein when the casing is attached to the adapter, a first distance from a surface of the flowable substance to the substrate is longer than a second distance from a surface of the flowable substance to the substrate when the casing is attached to the container.

* * * * *